United States Patent [19]
Kang et al.

[11] Patent Number: 6,118,858
[45] Date of Patent: Sep. 12, 2000

[54] CALL DISTRIBUTION PROCESSING METHOD FOR CALLED LINE NUMBER COMPUTATION IN PREMIUM-RATE SERVICE

[75] Inventors: Tae-Kyu Kang; Hyun-Joo Bae; Kyong-Ok Yun, all of Daejeon, Rep. of Korea

[73] Assignees: Electronics and Telecommunications Research Institute, Daejon; Korea Telecommunication Authority, Seoul, both of Rep. of Korea

[21] Appl. No.: 08/761,869

[22] Filed: Dec. 9, 1996

[30] Foreign Application Priority Data

Dec. 22, 1995 [KR] Rep. of Korea ............ 95-53966

[51] Int. Cl.[7] .................................................. H04M 15/00
[52] U.S. Cl. ................... 379/111; 379/114; 379/113; 379/34; 379/221
[58] Field of Search ................... 379/111, 112, 379/113, 114, 115, 118, 120, 121, 127, 128, 134, 219, 220, 221, 229, 272, 273, 265, 266, 144, 34

[56] References Cited

U.S. PATENT DOCUMENTS

| | | | |
|---|---|---|---|
| 5,084,816 | 1/1992 | Boese et al. . | |
| 5,163,042 | 11/1992 | Ochai | 370/17 |
| 5,291,543 | 3/1994 | Freese et al. | 379/114 |
| 5,381,467 | 1/1995 | Rosinski et al. | 379/113 |
| 5,392,344 | 2/1995 | Ash et al. | 379/111 |
| 5,420,914 | 5/1995 | Blumhardt | 379/114 |
| 5,425,090 | 6/1995 | Orriss | 379/201 |
| 5,448,632 | 9/1995 | Iyob et al. | 379/201 |
| 5,481,604 | 1/1996 | Minot | 379/221 |
| 5,519,769 | 5/1996 | Weinberger et al. | 379/112 |
| 5,553,124 | 9/1996 | Brinskele | 379/112 |
| 5,553,131 | 9/1996 | Minervino, Jr. et al. | 379/112 |
| 5,557,664 | 9/1996 | Burns et al. | 379/114 |
| 5,570,410 | 10/1996 | Hooshiari | 379/114 |
| 5,581,610 | 12/1996 | Hooshiari | 379/133 |
| 5,623,541 | 4/1997 | Boyle et al. | 379/112 |
| 5,638,433 | 6/1997 | Bubien, Jr. et al. | 379/130 |
| 5,712,908 | 1/1998 | Brinkman et al. | 379/112 |
| 5,732,127 | 3/1998 | Hayes | 379/112 |
| 5,774,530 | 6/1998 | Montgomery et al. | 379/114 |

FOREIGN PATENT DOCUMENTS 3-235562 10/1991 Japan .
WO 95/24093 9/1995 United Kingdom .

OTHER PUBLICATIONS

International Telecommunication Union, ITU–T "General Recommendations on Telephone Switching and Signalling" ITU–T Recommendation Q.1211 (Mar. 1993).

*Primary Examiner*—Curtis A. Kuntz
*Assistant Examiner*—Rexford N Barnie
*Attorney, Agent, or Firm*—Jacobson, Price, Holman & Stern, PLLC

[57] ABSTRACT

An improved call distribution processing method for a called line number computation in a premium-rate service of Intelligent Network is provided. The method is capable of routing to various called numbers designated in accordance with a calling area, performing a call distribution in accordance with the capacity of a called party number, and routing to a called number since this method does not degrade call processing performance of the system. Since a system load is less, the occurrence frequency per each digit when digits from one to a hundred is performed N-times evenly occurs, and the values which was generated in the function of the random numbers does not occur in the identical pattern.

6 Claims, 20 Drawing Sheets

FIG. 4

| pr_number(41) | | | | | | | |
|---|---|---|---|---|---|---|---|
| routing_rate_list(42) | | | | | | | |
| (43) | (44) | (45) | (46) | (47) | (48) | (49) | (50) |
| (51) | (52) | (53) | (54) | (55) | (56) | (57) | (58) |

FIG. 5

PREMIUM-RATE SERVICE SUBSCRIBER
CALL DISTRIBUTION TABLE(61)

| pr_number(63) |
| --- |
| routing_rate_list(64) |
| (65) (66) (67) (68) (69) (70) (71) (72) |
| (73) (74) (75) (76) (77) (78) (79) (80) |

CALLED NUMBER CALL DISTRIBUTION METHOD(84)

PREMIUM-RATE SERVICE SUBSCRIBER
CALLED NUMBER TABLE(62)

| pr_number(81) | index(82) | called_line_num(83) |
| --- | --- | --- |
|  | 1 |  |
|  | 2 |  |
|  | 3 |  |
|  | ⋮ |  |
|  | 16 |  |

CALL DISTRIBUTION PROCESSING METHOD FOR CALLED LINE NUMBER COMPUTATION IN PREMIUM-RATE SERVICE

BACKGROUND OF THE INVENTION

1. Field of the Invention

The present invention relates to a call distribution processing method for a called line number computation in a premium-rate service of Intelligent Network, and in particular to an improved call distribution processing method for a called line number computation in a premium-rate service which is capable of routing to various called numbers designated in accordance with a calling area, performing a call distribution in accordance with the capacity of a called party number, and routing to a called number since this method does not degrade call processing performance of the system since a system load is less, the occurrence frequency per each digit when digits from one to a hundred is performed N-times evenly occurs, and the values which was generated in the function of the random numbers does not occur in the identical pattern.

2. Description of the Conventional Art

In some countries, there is a service of a number 700 which is a kind of a premium-rate service. In this service of a number 700, when a kind of information which a subscriber wants is identical nationwide by analyzing seven digits which is formed like 700-NXXX in a service mass station of a number 700, a rerouting process is performed to a service connection station of a number 700 which service is offered in a small city area near a big city, and four digits except a number 700 is retransmitted, so that an information is offered from an audiotex system connected to a service-700 routing station.

In addition, an information service rate such as a service subscriber classification and a premium-rate computation, etc is determined based on the value of "N" of 700-NXXX.

In the routing of a service 700, a hierarchical distribution is another method which is different from a percentage distribution law according to the present invention. Namely, it is possible to route by using an area unit. It is impossible to perform a call distribution in real time based on a service subscriber nationwide.

The one-number service function is directed to using an identical service subscription number which is used nationwide irrespective of a service providing area.

An origin dependent routing service function is directed to analyzing an area code of a calling area and connecting by using an information provider (IP) equipment in a previously customizing called area.

As a prior art, Japanese Patent Application Publication 3-235562 entitled "a calling area identification method" was published in Feb. 13, 1990.

In a service control method which changes an applicable service matching with the number with respect to a predetermined calling number based on the calling area, if the service objective area is geographically divided into a plurality of standard area numbers (SAN), and it is divided into a customized area number (CAN) of a service subscriber, the above-described method is directed to a calling area identification method of identifying the standard area for the subscriber customizing area.

Since the above-describer method includes the standard area number (SAN) and the customized area number (CAN) and is directed to routing to a specific area in accordance with the calling area, it is impossible to route to a plurality of areas in accordance with the calling area. In addition, when routing to a plurality of areas, it is impossible to perform a call distribution in accordance with the capacity of the called party area.

Furthermore, there are several methods such as a call distribution method in accordance with the call distribution ratio which the service subscriber designated based on the accumulated statistics of the called number dependent number interpretation number, a method of using a function of random numbers when computing the called number index in accordance with the call distribution ratio, a method of using a memory address of a compute r, a method of using an inherent number value of a message which is requested by the service exchange system, and a method of computing into one millionth in the computer system.

In the conventional call distribution method which is performed based on the call distribution ratio designated by the service subscriber in accordance with the accumulated statistic of the called number dependent number interpretation number, if the number of service subscribers is 30,000, since there should be always given called number dependent statistic values with respect to 30,000 service subscribers, the load of the service control/management system is very big, for this degrading the performance of the call processing of the system.

When computing the called number index in accordance with the call distribution ratio, the method of using the function of the random numbers has the following disadvantages. Namely, when digits from one to a hundred are performed N-times, the occurrence frequency per each digit is not even, and since the values which occurred in the function of the random numbers occur in the identical pattern, it is impossible to rout to the called number in accordance with the call distribution ratio designated by the service subscriber.

When computing the called number index in accordance with the call distribution ratio, the method of using the memory address of the computer, the method of using the inherent number of the message requested by the service exchange system, and the method of computing based on one millionth which is provided by the computer system have a disadvantage in that the occurrence frequency per each digit when digits from one to a hundred is performed N-times in order to compute the index for computing the call distribution ratio does not evenly occur, so the service subscriber can not route to the called number in accordance with the call distribution ratio.

SUMMARY OF THE INVENTION

Accordingly, it is an object of the present invention to provide a call distribution processing method for a called line number computation in a premium-rate service which overcomes the problems encountered in the conventional art.

It is another object of the present invention to provide an improved call distribution processing method for a called line number computation in a premium-rate service which is capable of routing to various called numbers designated in accordance with a calling area, performing a call distribution in accordance with the capacity of a called party number, and routing to a called number since this method does not degrade call processing performance of the system since a system load is less, the occurrence frequency per each digit when digits from one to a hundred is performed N-times evenly occurs, and the values which was generated in the function of the random numbers does not occur in the identical pattern.

To achieve the above objects, there is provided an improved call distribution processing method for a called line number computation in a premium-rate service which includes the steps of a first step (141 through 146) for registering a subscriber dependent information rate class, date and time and information discount ratio, a calling area code dependent called number, and a call distribution rate which are a subscriber's designation information, initializing a call distribution rate processing main pointer value to "1", designating the service subscriber number as an index value of a main table by receiving a service subscriber number from a service exchange system, and searching whether there is a data based on the designated index value by reading the main table, and a second step (147 through 153) for designating and informing a vacant number indicating code value when there is not the data in the first step, performing a call distribution service function, a calling area dependent routing service function, and a calling area dependent call distribution service function when there is the data, and the subscriber subscribed the service, and transmitting the computed called number, the information level, the information discount rate, etc by performing one number service function when the subscriber did not subscribe the service.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a diagram illustrating a premium-rate service subscriber call distribution table according to the present invention;

FIG. 5 is a diagram illustrating a premium-rate service subscriber called number call distribution according to the present invention;

DETAILED DESCRIPTION OF THE INVENTION

Figure 1:
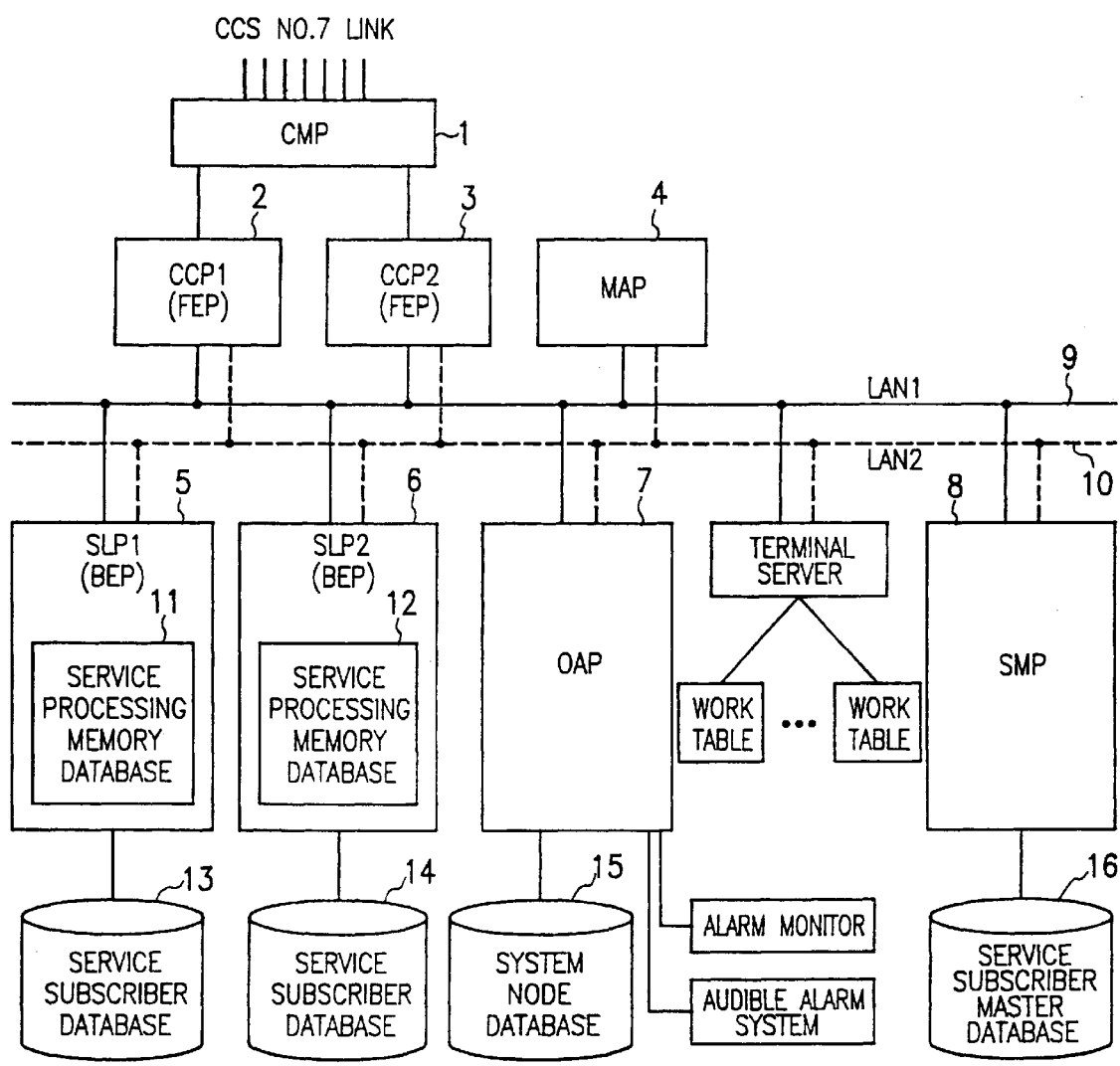
FIG. 1 is a block diagram illustrating an intelligent network control/management system according to the present invention.

FIG. 1 is a block diagram illustrating an intelligent network control/management system according to the present invention.

In the drawing, reference numeral 1 denotes a CCS7 message transfer part (CCS7 MTP) processor, 2 and 3 denote a common channel signaling processor (CCP), 4 denotes a minor operation and administration processor (MAP), 5 and 6 denote a service logic processor (SLP), 7 denotes an operation and administration processor (OAP), 8 denotes a service management processor (SMP), and 9 and 10 denote a local area network (LAN).

The system based on the network which provides an intelligent network includes a function integrating a service control point (SCP) which is a service control node and a service management system (SMS).

In this system, when a predetermined question is inputted from the service exchange system, a proper answer to the question is provided. Namely, it serves to control various communication networks and receives a transaction through a CMP 1 connected to a signal network.

Since the inputted transaction is formed in a signal protocol message, the CCPs 2 and 3 process a signal connection control and a transaction handler when processing a protocol layer, and this result is processed as a dialogue handler in the protocol by the SLPs 5 and 6. So as to make a response related to the service, a proper response is generated by the service dependent logic data which exists in the service process data bases 11 and 12 of the SLPs 5 and 6, and the result is transmitted in the reverse order.

Here, the multiplexing of each processor is directed to obtain a high performance and reliability of the system. The transaction is processed in the normal circumstance by evenly processing the interload process by using the CCPs 2 and 3 and the SLPs 5 and 6. In the case that one component is abnormal, all the loads are performed by a normal processor.

The OAP 7 is a processor for the operation management and maintenance of the system. This OAP 7 initially drives the system, initializes the system, and performs a necessary function related to the entire operations of a system configuration, an operation data management, a processor checking, and a reoperation of the system. In order to perform the above-described operations, the OAP 7 includes a system node database 15.

The MAP 4 is a processor for alternately performing the function of the OAP 7. If the OAP 7 can not perform its function, the system operation is performed without stop.

In the SLPs 5 and 6, the service logic data exists in a form of service process memory database 11 and 12 and service subscriber database 13 and 14 for the service process. The reason for the duplicated management is to satisfy the characteristic that the service call process is performed in real time, so there are provided the service process memory database 11 and 12 as the memory resident database and the service subscriber database 13 and 14 for the backup and recover of the service logic data.

In the main system, the service subscriber data is stored in the SMP 8, the SLP1 5, and the SLP2 6 so as to provide a premium-rate service. These are a service subscriber master database 16, the service process memory database 12 and 13, and the service subscriber database 13 and 14. Since the service process memory database 11 and 12, and the service subscriber database 13 and 14 have the identical format, the premium-rate service subscriber database is referred to both the service process memory database 11 and 12 and the service subscriber database 13 and 14.

The SMP 8 includes the service master database 16 for minimize the effects to the real time service call process as a processor for controlling the subscriber data management and the service operation state of the intelligent network service.

The database of the intelligent network service control/management system is formed in various forms in accordance with the type of the data and the characteristic of the database. The database having a direct relationship with the present invention among the various database is a service subscriber database. The service subscriber database is used for storing the subscriber data so as to receive the requests with respect to the intelligent service subscriber independent service.

The name of the hardware of the SLP1 and SLP2 in which the premium-rate service subscriber database is installed is a HP 9000 series 855 system. The main memory of the system is 96 Mega bytes, and the sharing memory is 64 Mega bytes. The name of the software of the real time-based database is SHP RTDB A.01.00. The characteristic thereof is a memory resident type database and a relevant type database.

Figure 2:
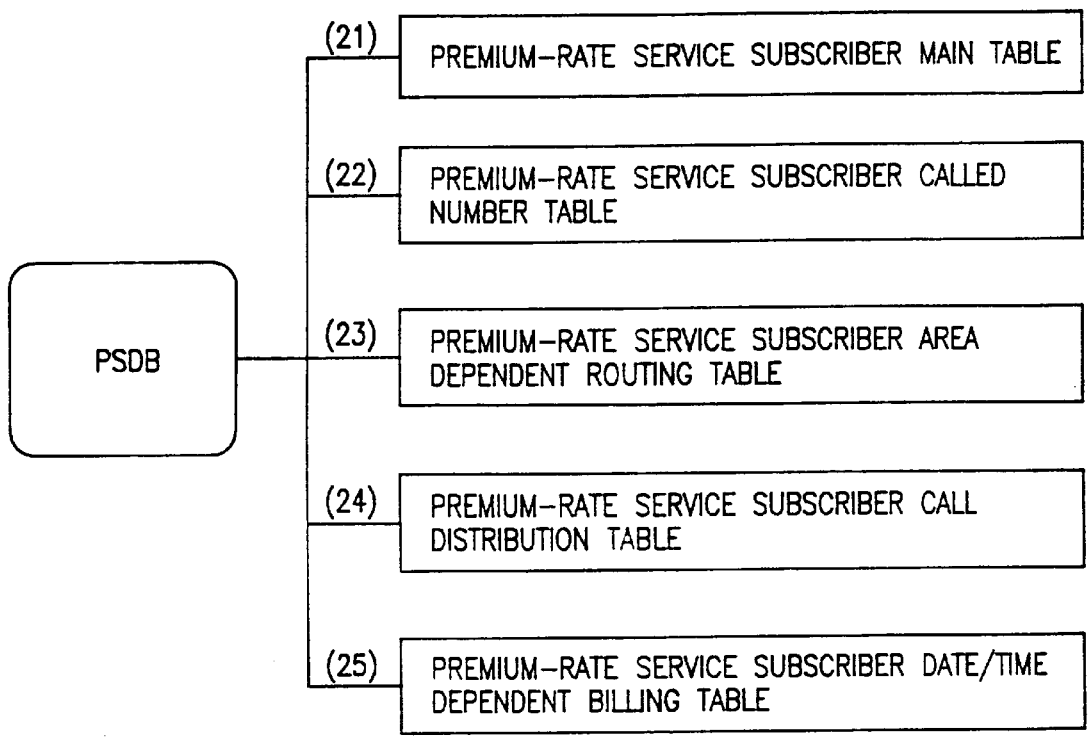
FIG. 2 is a diagram illustrating a premium-rate service subscriber database system according to the present invention.

FIG. 2 is a diagram illustrating a premium-rate service subscriber database system of the service subscriber database 13 and 14 according to the present invention. Namely, FIG. 2 is a diagram illustrating the construction of the service subscriber database 13 and 14.

As shown therein, the premium-rate service subscriber database includes a premium-rate service subscriber main table 21, a premium-rate service subscriber called number table 22, a premium-rate service subscriber area dependent routing table 23, a premium service subscriber call distribution table 24, and a premium-rate service subscriber date and time dependent table 25.

The premium-rate service subscriber main table 21 and the premium-rate service subscriber called number table 22 are the table that all service subscribers should pay for it. The premium-rate service area dependent routing table 23, the premium-rate service subscriber call distribution table 24, the premium-rate service subscriber date and time dependent table 25, etc are used based on the subscriber's service function.

The data items which are necessary for the calling area dependent routing is stored in the premium-rate service subscriber area dependent routing table 23, and the data items which are necessary for the call distribution function is stored in the premium-rate service subscriber call distribution table 24, and the data items which are necessary for the premium-rate service data and time dependent table 25.

The premium-rate service subscriber call distribution table 24 does not have a direct relationship to the subject matter of the present invention.

Figure 3:
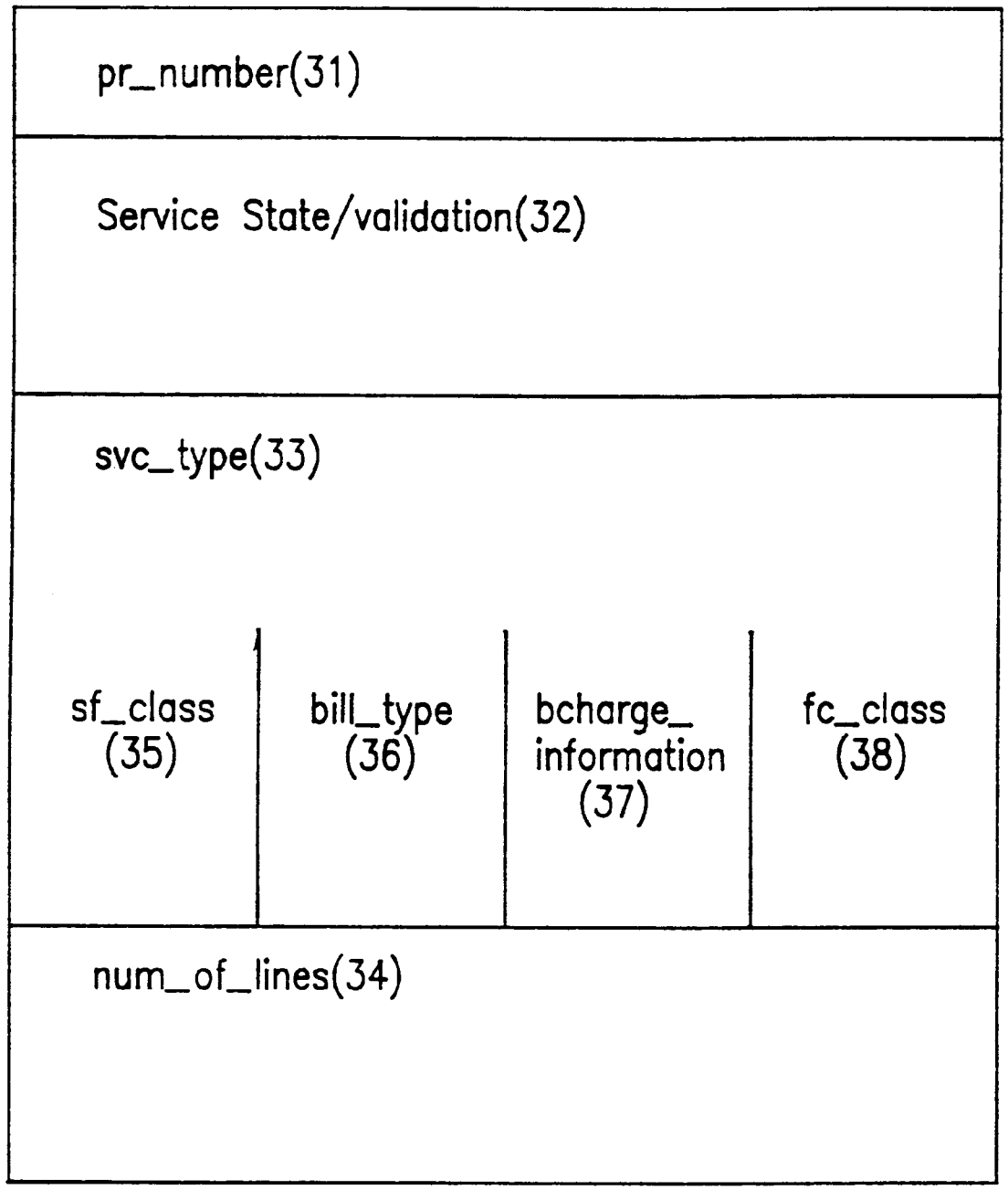
FIG. 3 is a diagram illustrating a premium-rate service subscriber main table according to the present invention.

FIG. 3 is a diagram illustrating a premium-rate service subscriber main table according to the present invention, which diagram is intended to in more detail explain the premium-rate service subscriber main table 21 of the premium-rate service subscriber database of FIG. 2 according to the present invention.

The premium-rate service subscriber main table includes a subscriber number pr_number 31, a service state/validation 32, a service function type svc_type 33, and a total called number num_of_lines 34.

The subscriber number pr_number 31 is used as an index value of the premium-rate service subscriber main table.

It is possible to store the data such as the service state/validation 32, the service function type svc_type 33, and the total called number num_of_lines 34 in accordance with the subscriber's number pr_number 31 which is the index value of the premium-rate service subscriber main table.

A subscriber of the premium-rate service is given a subscriber number 31.

The service function type sve_type 33 includes a service function classification sf_class 35, a bill type bill_type 36, a basic charge information bcharge_information 37, and a temporary classification fc_class 38.

It is possible to store a service function such as a rate change based on date and time, a call distribution, a calling area dependent routing, etc in the service function classification 35.

The date and time dependent classification 38 is offered to only the subscriber who subscribed the data and time dependent change service.

A service application state such as a specific date among date and time rate changes, a specific day, a specific time, a legal holiday, etc is stored in the date and time classification 38.

In addition, the date and time classification 38 includes the bill type bill_type 36, the basic charge information 37, etc.

FIG. 4 is a diagram illustrating a premium-rate service subscriber call distribution table according to the present invention.

Namely, FIG. 4 is a diagram illustrating the premium-rate service subscriber call distribution table 24, in more detail, of the construction of the premium-rate service subscriber database of FIG. 2 according to the present invention.

The premium-rate service subscriber call distribution table includes a subscriber number pr__number 41, and a routing rate list routing__rate__list 42.

The subscriber number pr__number 41 is used as an index value of the premium-rate service subscriber call distribution table.

In addition, it is possible to store and search the data of the routing rate list routing__rate__list 42 in accordance with the subscriber number pr__number 41.

The routing rate list routing__rate__list 42 stores sixteen route rates. Each of the sixteen routing rates 43 through 58 of the routing rate list routing__rate__list 42 has a relative rate which may be connected to a telephone line. The relative rate can be expressed as digits from 0 to 100. Each of the routing rates 43 through 58 of the routing rate list routing__rate__list 42 has a series value from 1 to 16 which is the called number index value.

FIG. 5 is a diagram illustrating a premium-rate service subscriber called number call distribution according to the present invention.

As shown therein, the premium-rate service subscriber called number call distribution method is directed to reading a premium-rate service subscriber call distribution table by using a premium-rate service subscriber number 63 as an index value in the case that the call distribution is performed by reading the premium-rate service main table by using the premium-rate service subscriber number which is received from the service exchange system.

At least one or sixteen routing rates 65 through 68 based on the premium-rate service subscriber number 63 of the premium-rate service subscriber call distribution table 61 is/are used For computing the called number by using an index 82 which is computed by the called number call distribution system(method) 84 and a premium-rate service subscriber number 81 as an index of the premium-rate service subscriber called number table 62.

The called number 83 is a physical routing number which must be really connected to the premium-rate service subscriber. On the contrary, the service subscriber number is the number for dialing so as to use the premium-rate service. Here, the service subscriber number is called a logic number, and the called number is called a number-interpreted physical number.

Figure 6:
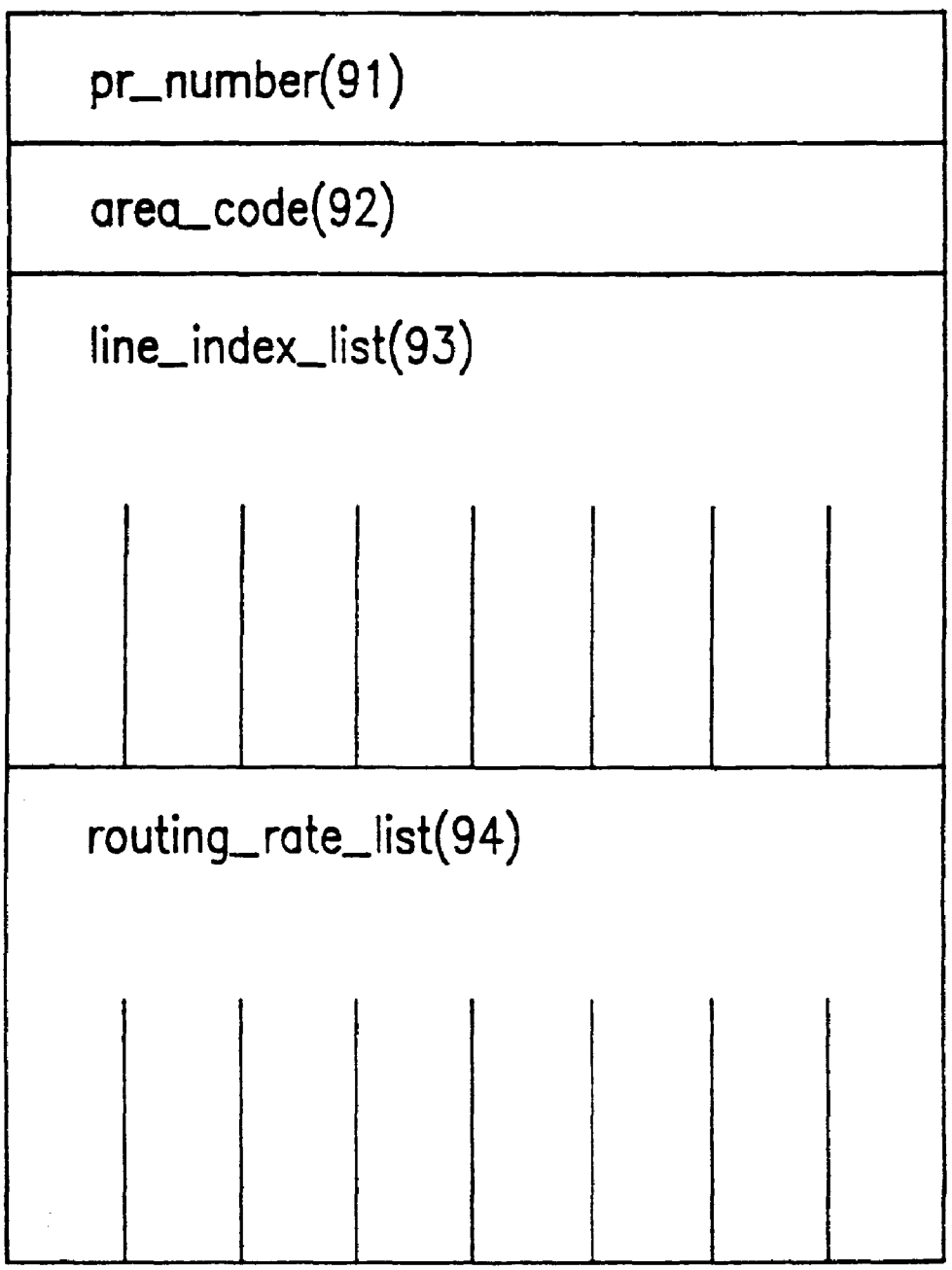
FIG. 6 is a diagram illustrating a premium-rate service subscriber area-based routing table according to the present invention.

FIG. 6 is a diagram illustrating a premium-rate service subscriber area-based routing table according to the present invention, which diagram illustrate in more detail the premium-rate service subscriber area dependent routing table 23 of the construction of the premium-rate service subscriber database of FIG. 2.

The construction of the premium-rate service subscriber area dependent routing table includes a subscriber number pr__number 91, an area code area__code 92, and a routing rate list routing__rate__list 93.

The subscriber number pr__number 91 and the area code area__code 92 are used as the index value of the premium-rate service subscriber area dependent routing table.

In addition, it is possible to store and search the data of the called number index list line__index__list 93, and the routing rate list routing__rate__list 94 in accordance with the subscriber number pr__number 91 and the called area code area__code 92 which are the index value of the premium-rate service subscriber area dependent routing table.

Figure 7:
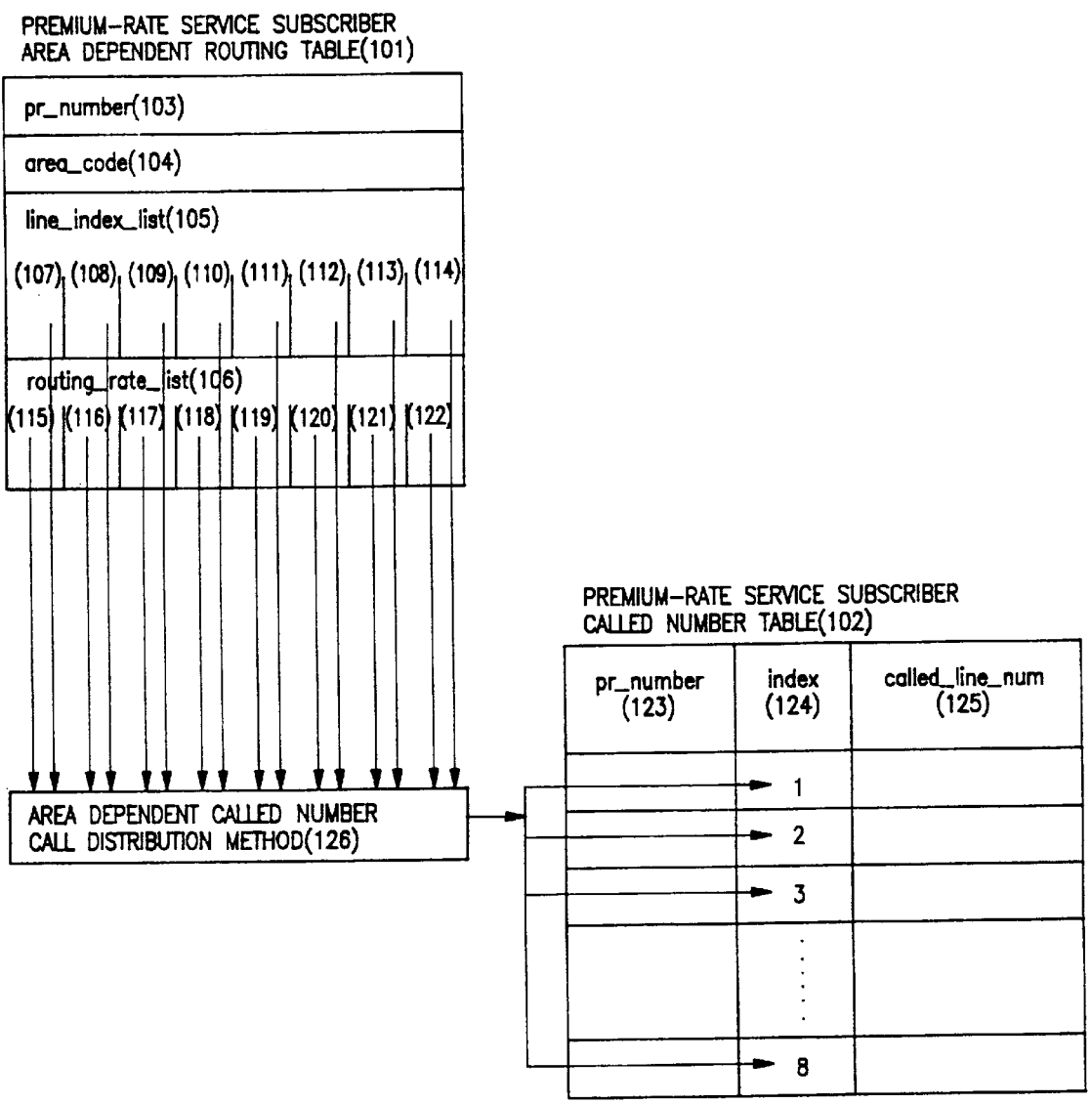
FIG. 7 is a diagram illustrating a premium-rate service subscriber area-based called number call distribution according to the present invention.

The called number index list line__index__list 93 includes a list of the index with respect to an available called number of the service subscriber. The index selected from the called number index list is used as the index 124 of the premium-rate service subscriber called number table 102 in the premium-rate service subscriber area dependent called number call distribution method as shown in FIG. 7.

Eight routing rates can be stored in a routing rate list routing__rate__list 94.

Each of the eight routing rates of the routing rate list routing__rate__list 94 has a state rate which is really connected to the telephone line. The state rate can be expressed as digits from 0 to 100.

The sum of eight routing rates of the routing rate list routing__rate__list 42 is 100.

The eight routing rates of the routing rate list routing__rate__list is a routing rate with respect to each of the called number index list line__index__list so as to obtain a called number index value which is an actually available line.

FIG. 7 is a diagram illustrating a premium-rate service subscriber area-based called number call distribution according to the present invention.

The premium-rate service subscriber area dependent called number call distribution method is directed to reading the premium-rate service subscriber called number table 102 only when it is subscribed to the calling area dependent routing and calling area dependent call distribution routing service function by reading the premium-rate service main table by using the premium-rate service subscriber number which is received from the service exchange system.

The premium-rate service subscriber area dependent routing table 101 includes at least one or maximum eight called number index lists 105 and 107 through 114 based on the premium-rate service subscriber number 103 and the area code 104, and routing rate lists 106 and 115 through 122 each having at least one or maximum eight routing rates.

The called number index lists 107 through 114 and the routing rates 115 through 122 are directed to computing a called number 125 by using an index 124 computed by an area dependent called number call distribution method 126 and an index of the premium-rate service subscriber called number table 102.

The called number 125 is a physical routing number which must be really connected to the premium-rate service subscriber. On the contrary, the service subscriber number is the number to which the premium-rate service user dials. Here, the service subscriber number is called a logic number, and the called number is called a number-interpreted physical number.

Figure 8:
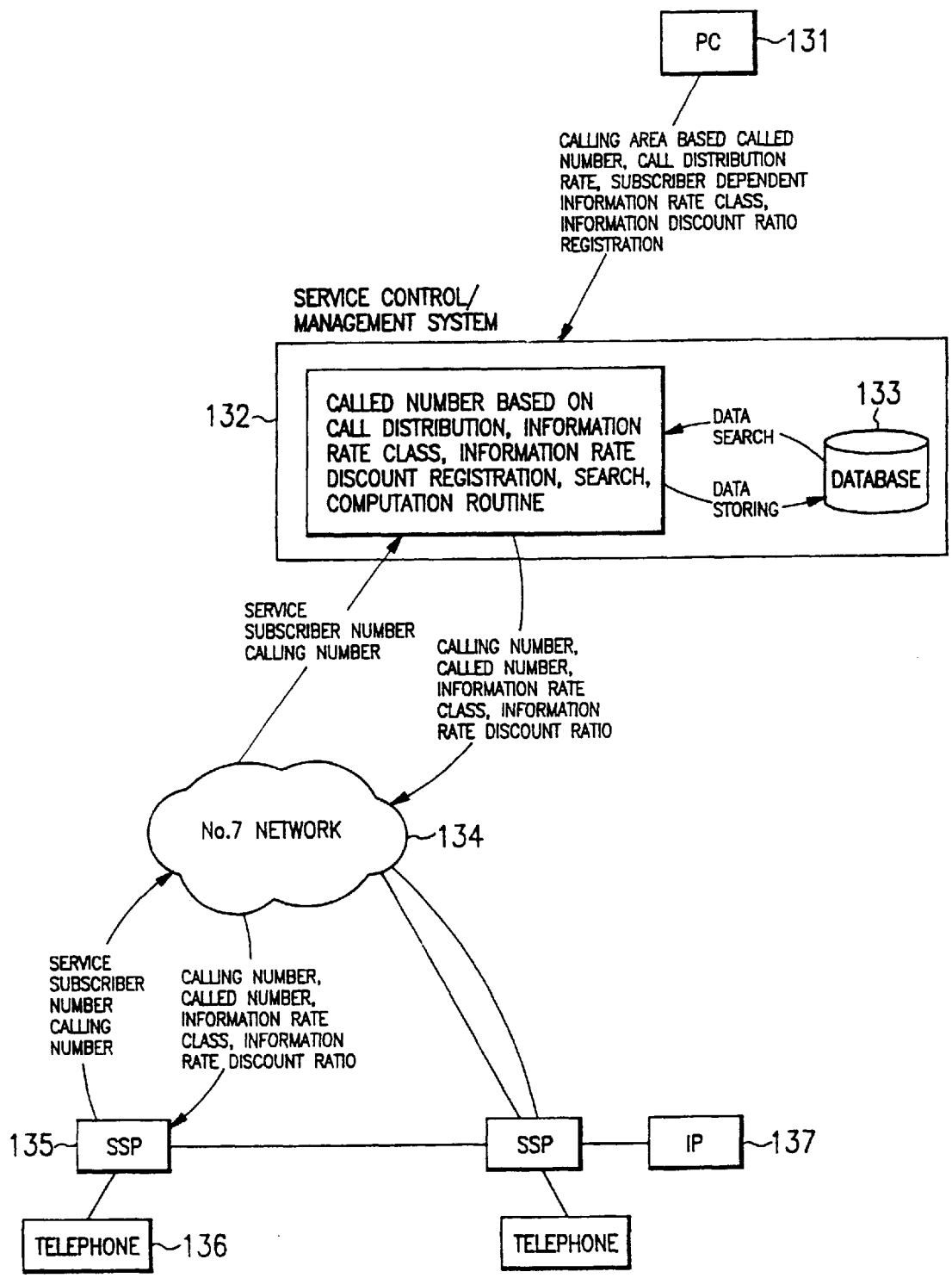
FIG. 8 is a diagram for explaining the operation of a premium-rate service of an intelligent network according to the present invention.

FIG. 8 is a diagram for explaining the operation of a premium-rate service of an intelligent network according to the present invention.

The data must be stored in a service control/management system 132 so as to provide the premium-rate service. The subscriber dependent premium rate level which is a subscriber's customized data based on the type of the subscriber, the date and time service discount rate, and the calling area code dependent called number, and the call distribution rate are inputted to the service control/management system 132 through a terminal 131, and the service control/management system 132 stored these data to a database 133.

When the service user dials the premium-rate service subscriber number by using a telephone 136 connected to the local exchange system or a service exchange system SSP 135, the service exchange system 135 requests the calling number and the service subscriber number of the service user to the service control/management system 132 through a number-7 network 304 which uses a common signal method. The service control/management system 132 requests a question to the database 132 in accordance with the requested subscriber number. In addition, the service control/management system 132 searches the database 133 in accordance with the requested service subscriber number, and transmits the computed called number, the rate, and the premium discount rate to the service exchange system 135 in accordance with a predetermined processing routine such as a call distribution service function. The service exchange system which received the called number is connected to an information provider (IP) 137, so that the service user can use the information of the service subscriber 136.

Figure 9:
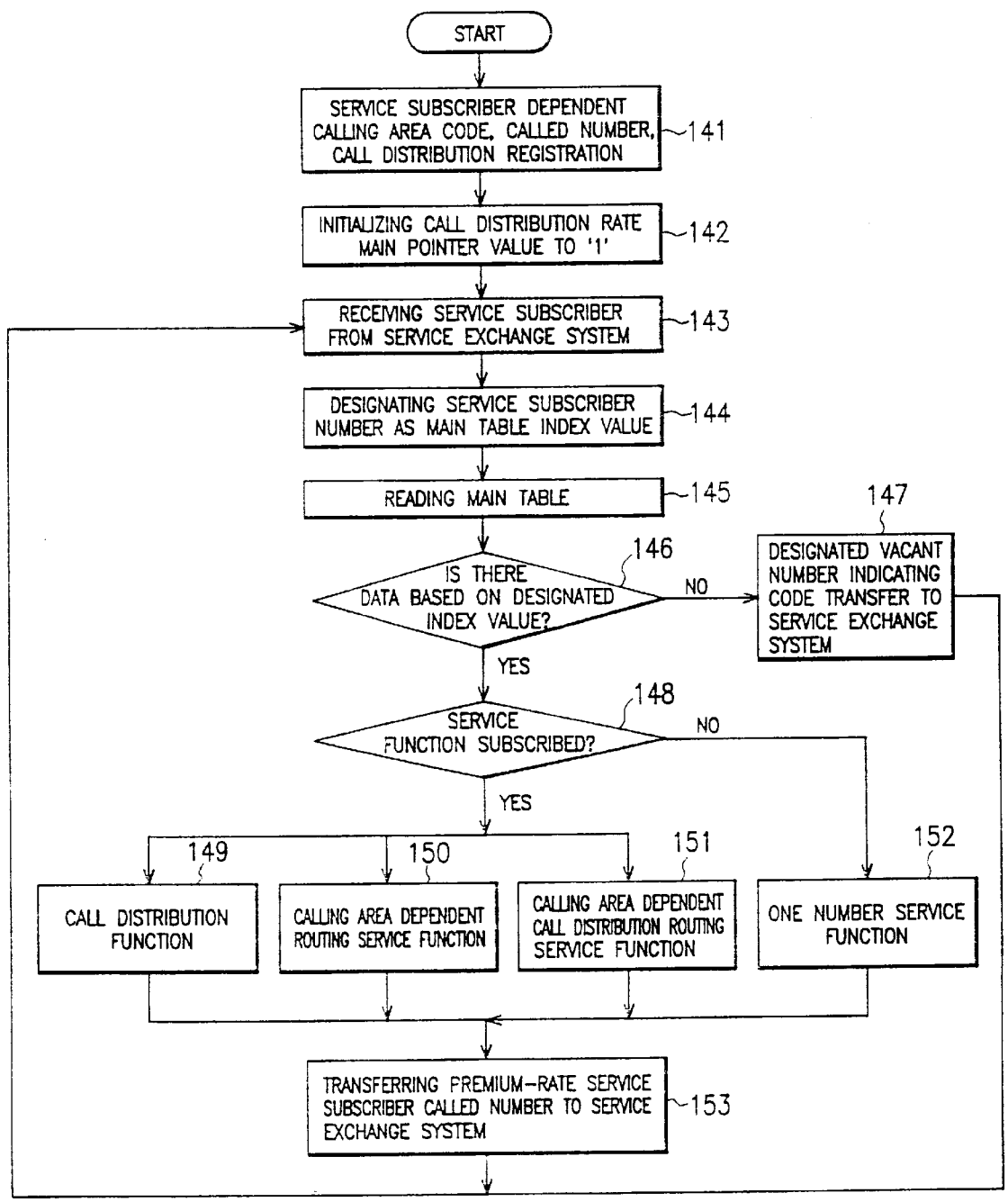
FIG. 9 is a flow chart of a call distribution process for computing a called number for a premium-rate service according to an embodiment of the present invention.

FIG. 9 is a flow chart of a call distribution process for computing a called number for a premium-rate service according to an embodiment of the present invention.

The service subscriber dependent calling area code, the called number, the call distribution rate, etc which are data for computing the service subscriber dependent called number are inputted -through the terminal, and are stored in the database, for thus registering the service subscriber in step 141.

The call distribution processing value is initialized to "1" in step 142. When the call distribution rate processing value is initialized to "1", it is possible to compute an even call distribution level without repeating the same routine.

When the service subscriber number and the calling number are received through the common signal method number-7 network, the service subscriber number is received from the service exchange system in step 143.

The service subscriber number is designated as an index value 31 of the premium-rate service main table 21 in step 144.

The premium-rate service main table 21 is read in step 145.

It is judged whether a designated index value exists in step 146.

If there is not a data, a predetermined code value is designated and is transmitted to the service exchange system in step 147. After the code value with respect to the computed premium-rate service subscriber number is designated and is transmitted to the service exchange system, the routine is in a ready mode until a new service subscriber is inputted in step 143.

If there is a data, it is judged whether the subscriber is applied to the service function in step 148.

Figure 10:
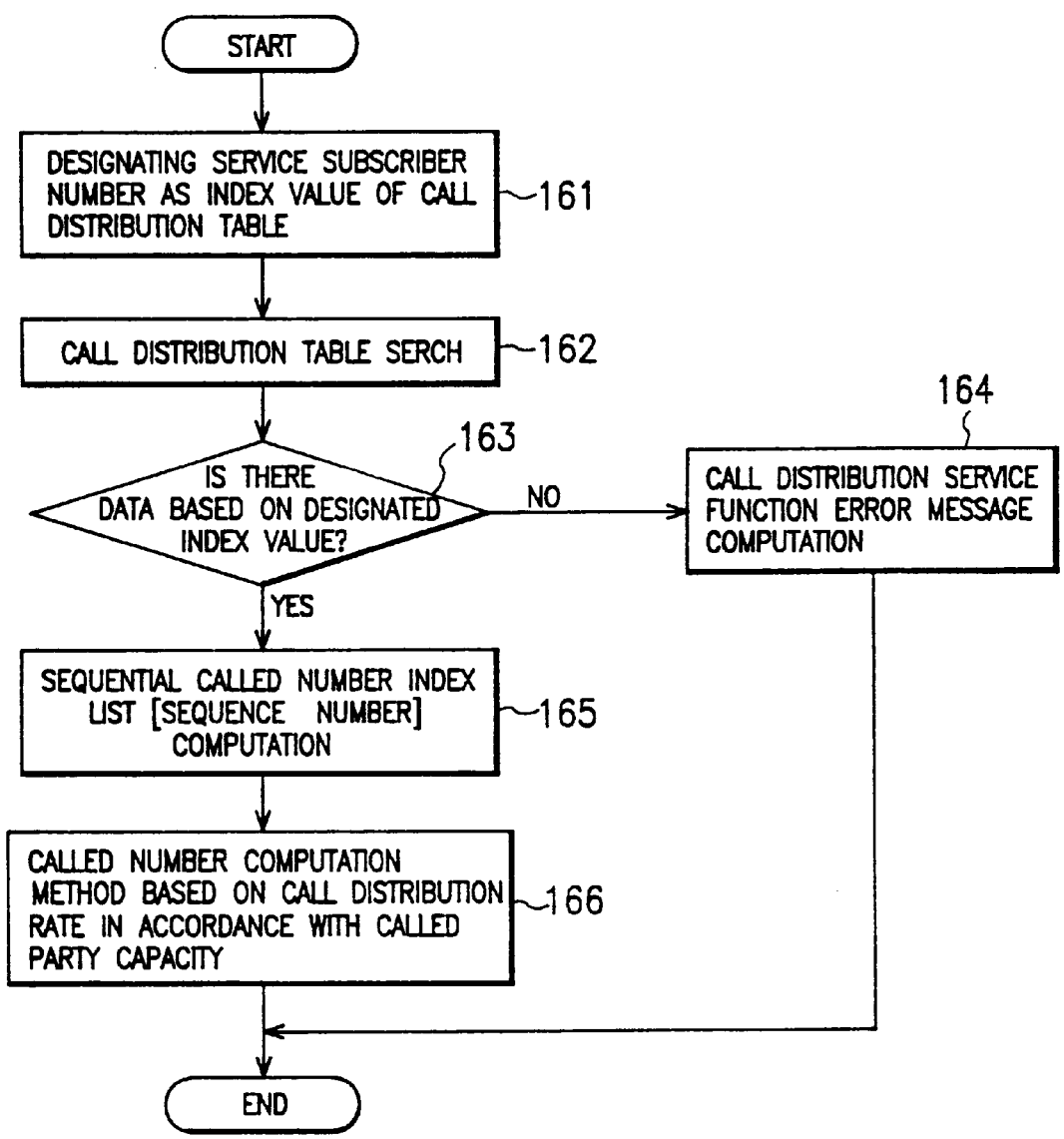
FIG. 10 is a flow chart of a call distribution service function process according to another embodiment of the present invention.
Figure 11:
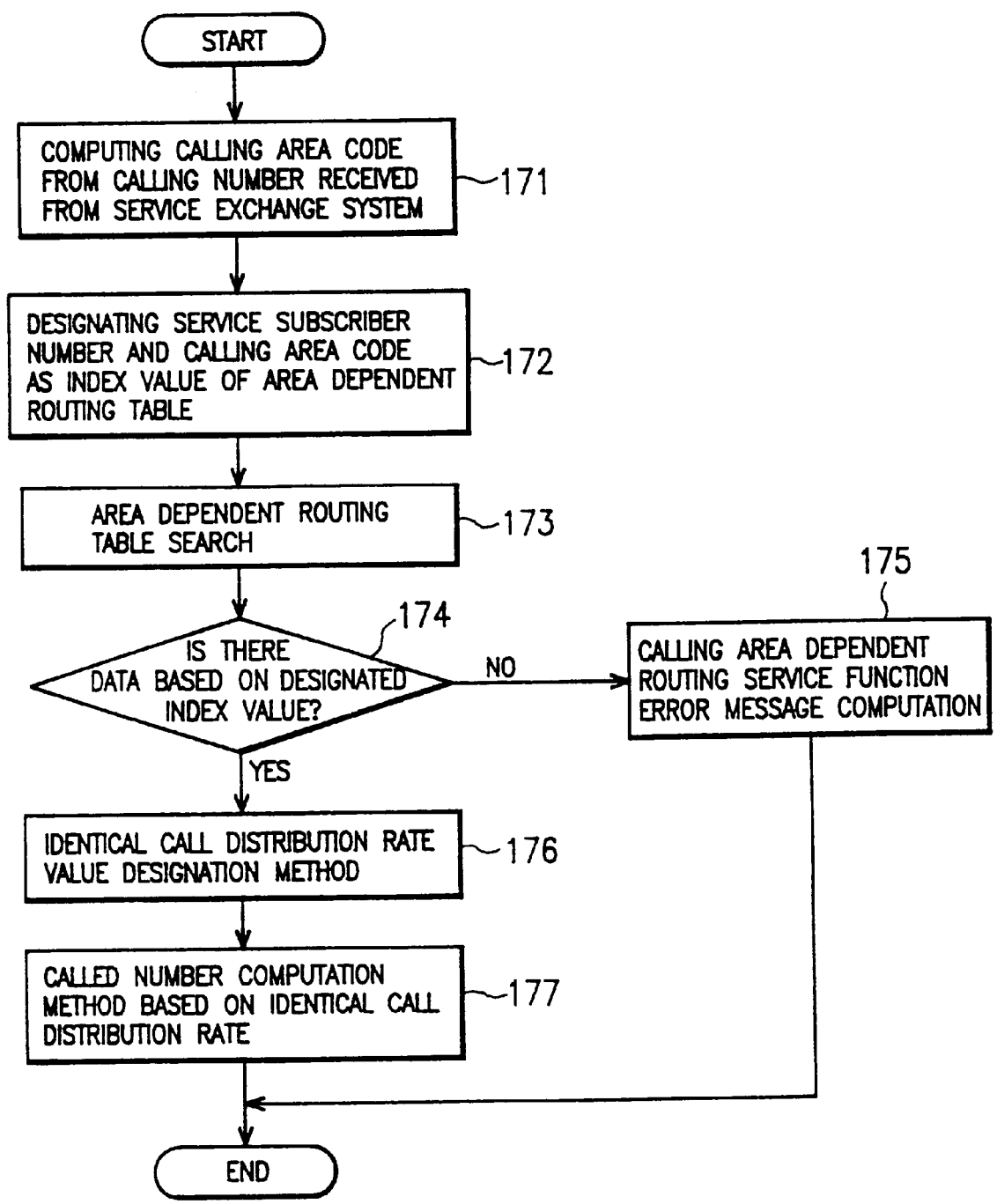
FIG. 11 is a flow chart of a calling region-based routing service function process according to still another embodiment of the present invention.

If there is a data, and the subscriber is applied to the service function, the call distribution service function 149, the calling area dependent routing service function 150, the calling area dependent call distribution routing service function 151, etc are classified and processed. FIG. 10 is a flow chart so as to explain the called number computation method based on the call distribution service function. FIG. 11 is a flow chart so as to explain the called number computation method based on the calling area dependent routing service function. Figure is a flow chart so as to explain the called number computation method based on the calling area dependent call distribution routing service function.

If there is a data, and the subscriber does not apply the service function, the called number is computed by one number system in step 152.

The computed premium-rate service subscriber called number is transmitted to the service exchange system in step 153.

The computed premium-rate service subscriber called number is transmitted to the service exchange system, and the routine is in a ready mode until a new service subscriber number is inputted from the service exchange system in step 143. Namely, the service subscriber number is inputted from the service exchange system, and the service subscriber called number is computed and is transmitted to the service exchange system. The above-described processes are repeatedly performed.

FIG. 10 is a flow chart illustrating the call distribution service function process according to an embodiment of the present invention.

Namely, FIG. 10 is a flow chart so as to explain the call distribution service function of FIG. 9 in more detail.

The service subscriber number is designated as an index value of the call distribution table in step 161.

The call distribution table is searched in step 162.

It is judged whether there is a data by designating the service subscriber number as the index value and searching the call distribution table in step 163. If there is not a data, a call distribution service function error message is outputted, and the routine is terminated in step 164.

If there is a data, the called number index list [a sequence number] is computed in step 165.

Since there is not the called number index list [a sequence number] which is designated by the service subscriber, "1" is designated for the called number index list [0], "2" is designated for the called number index list [1], "3" is designated for the called number index list [2], "4" is designated for the called number index list [3], "5" is designated for the called number index list [4], "6" is designated for the called number index list [5], "7" is designated for the called number index list [6], and "8" is designated for the called number index list [7].

After the called number index list [a sequence number] is computed, the called number computation method (166) based on the call distribution rate in accordance with the called party capacity, and the routine is terminated.

FIG. 11 is a flow chart so as to explain the calling area dependent routing service function process according to another embodiment of the present invention.

Namely, FIG. 11 is a flow chart so as to explain the calling area dependent routing service function (150) of FIG. 9.

The calling area code is computed from the calling number received from the service exchange system in step 171.

The service subscriber number and the calling area code are designated as an index value of the area dependent routing table in step 172.

The area dependent routing table is searched in step 173.

The service subscriber number and the calling area code are designated as an index value of the area dependent routing table, and it is judged whether there is a data by searching the area dependent routing table in step 174. If there is not a data, the calling area dependent routing service function error message is computed in step 175.

The service subscriber number and the calling area dependent code are designated as an index value of the area dependent routing table. If there is a result data after searching the area dependent routing table, the identical call distribution value designation method (176) is performed, and the called number computation method (177) based on the identical call distribution ratio is processed.

Figure 20:
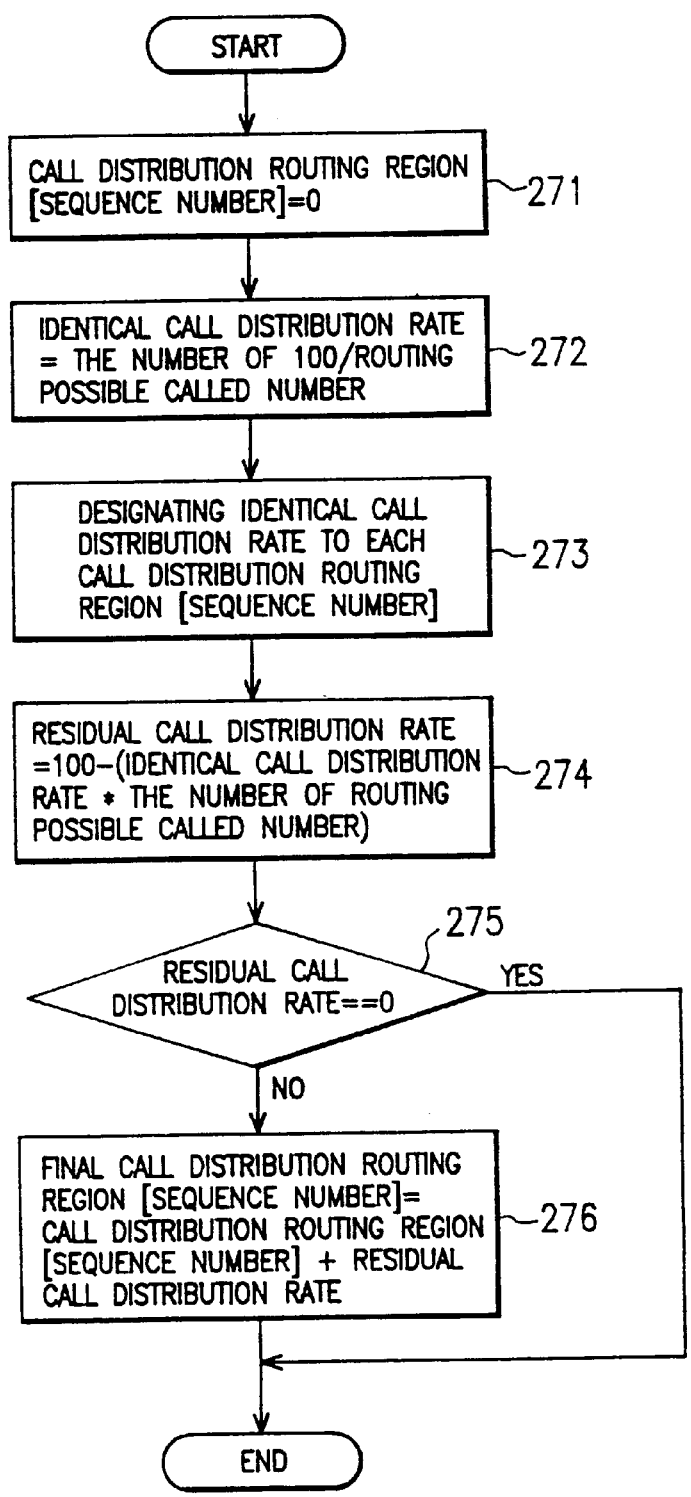
FIG. 20 is a flow chart of an identical call distribution ratio value customizing process according to still another embodiment of the present invention.

The identical call distribution rate value designation method (176) is explained in the identical call distribution rate value designation process of FIG. 20.

Figure 14:
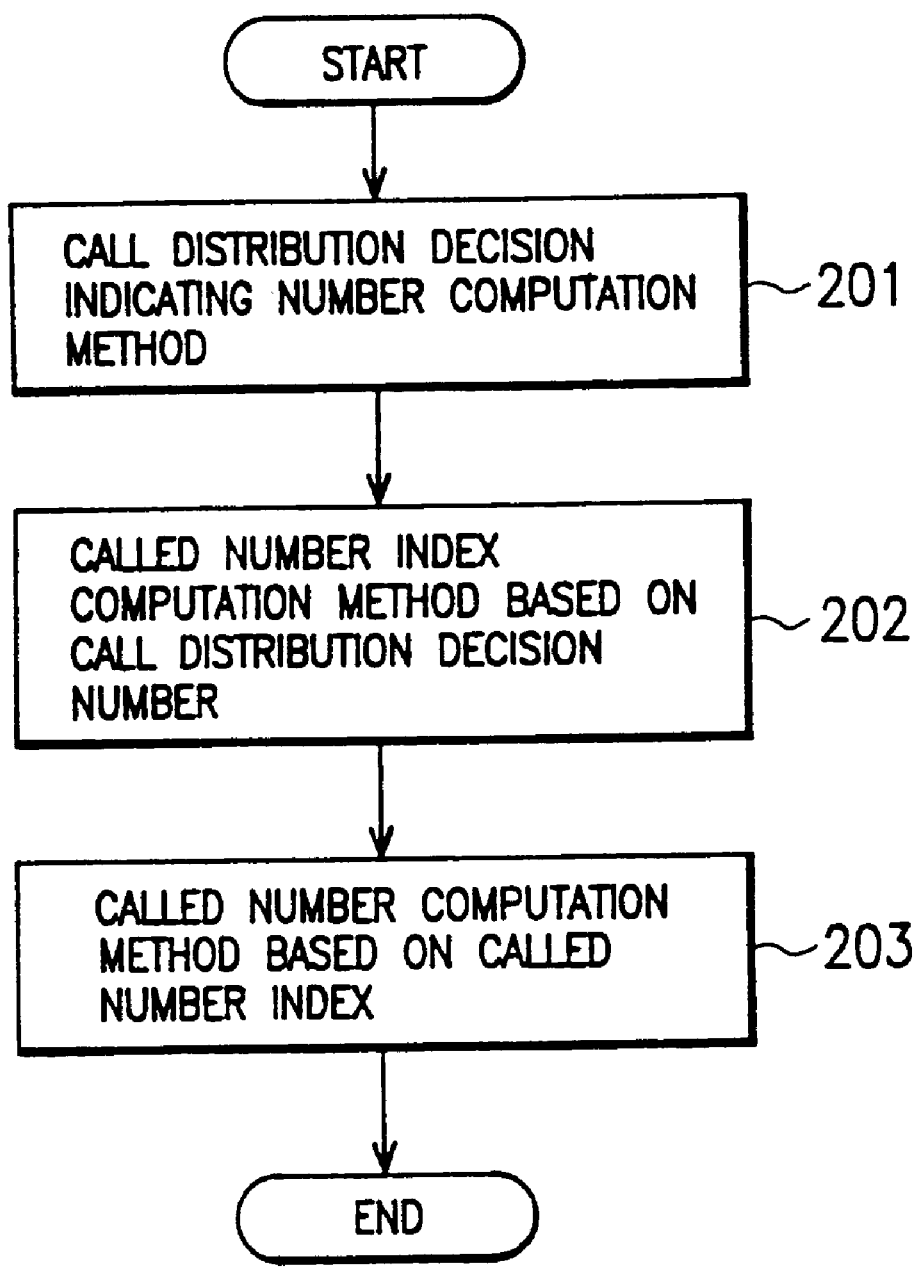
FIG. 14 is a flow chart of a called number computation based on an identical call distribution ratio according to still another embodiment of the present invention.

The called number computation method (177) based on the identical call distribution rate is explained in the called number computation flow chart based on the identical call distribution rate of FIG. 14.

Figure 12:
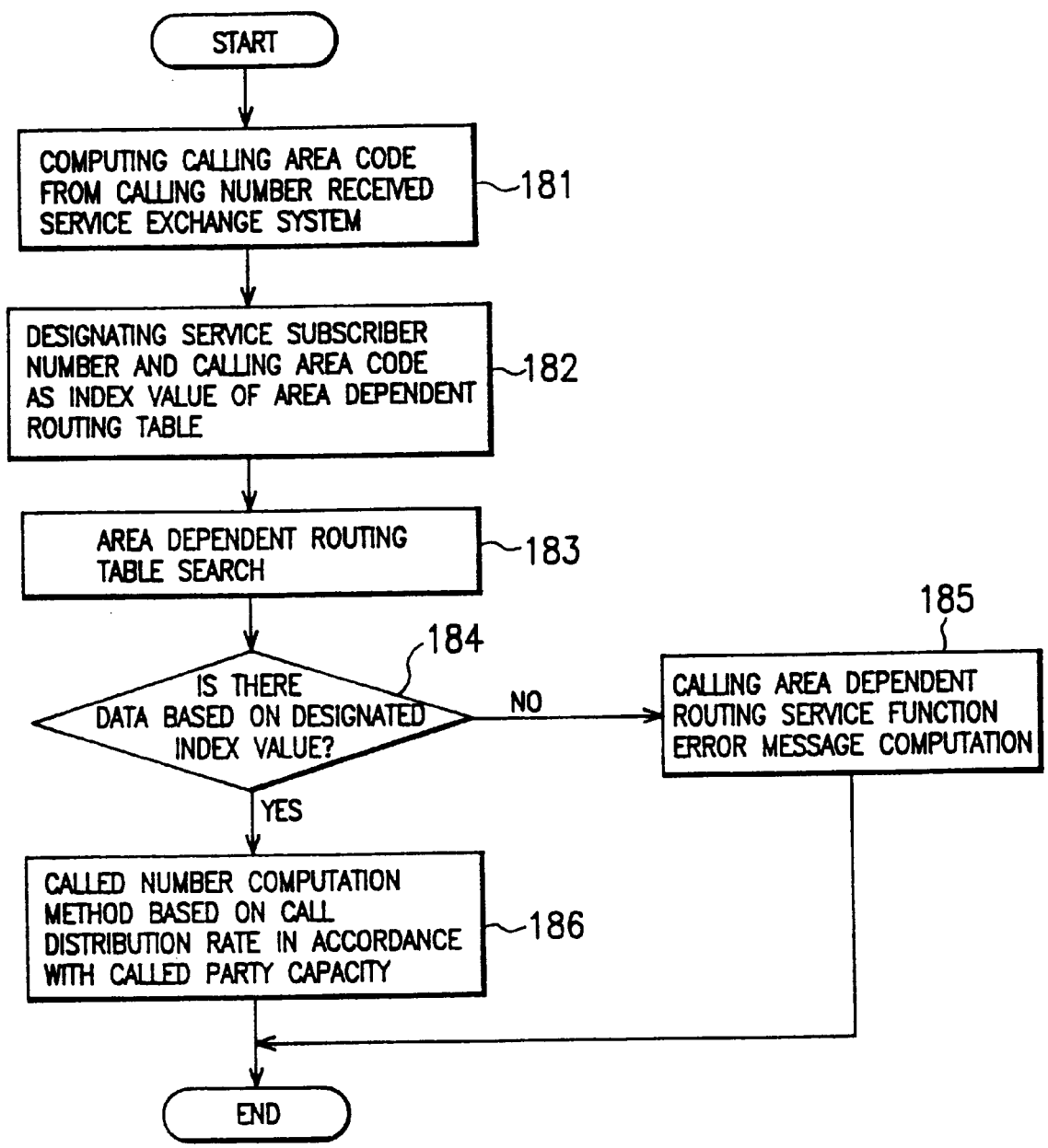
FIG. 12 is a flow chart of a calling area call distribution routing service function process according to still another embodiment of the present invention.

FIG. 12 is a flow chart so as to explain the calling area dependent call distribution routing service according to another embodiment of the present invention.

Namely, FIG. 12 is a flow chart so as to explain the calling area dependent call distribution routing service function (151) of FIG. 9 in more detail.

The calling area code is computed from the calling number received from the service exchange system in step 181.

The service subscriber number and the calling area code are designated as an index value of the area dependent routing table in step 182.

The area dependent routing table is searched in step 183.

The service subscriber number and the calling area code are designated as an index value of the area dependent routing table, and it is judged whether there is a data by searching the area dependent routing table. If there is not a data in step 184, the calling area dependent routing service function error message is computed in step 185.

The service subscriber number and the calling area code are designated as an index value of the area dependent routing table. If there is a data as a result of the search with respect to the area dependent routing table, the called number computation method (186) is performed based on the call distribution rate in accordance with the called party capacity.

The called number computation method (186) based on the call distribution rate in accordance with the called party capacity will be explained in more detail with reference to the flow chart of the called number computation based on the call distribution rate based on the called party capacity.

Figure 13:
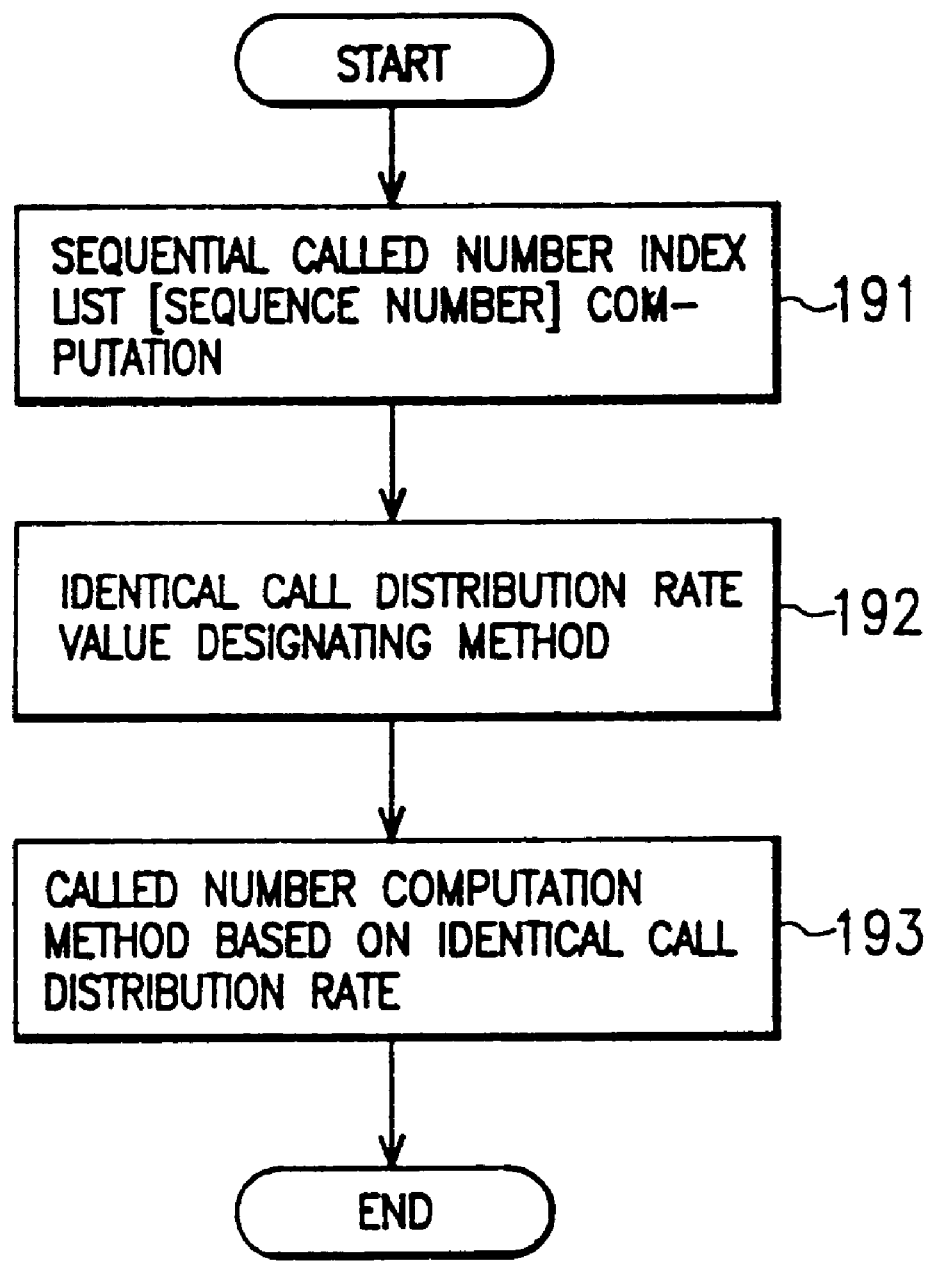
FIG. 13 is a flow chart of a one-number service function process according to still another embodiment of the present invention.

FIG. 13 is a flow chart so as to explain one number service function process according to another embodiment of the present invention.

Namely, the one number service function (152) of FIG. 9 is explained in FIG. 13 in more detail.

The called number index list [a sequence number] is computed in step 191. Since there is not the called number index list [a sequence number] which is designated by the service subscriber, "1" is designated for the called number index list [0], "2" is designated for the called number index list [1], "3" is designated for the called number index list [2], "4" is designated for the called number index list [3], "5" is designated for the called number index list [4], "6" is designated for the called number index list [5], "7" is designated for the called number index list [6], and "8" is designated for the called number index list [7].

The called number index list [a sequence number] is computed, and the identical call distribution rate value designation method (192) is performed. After the identical call distribution rate value designation method (192) is processed, the called number computation method(193) is processed based on the identical call distribution rate and is terminated.

FIG. 14 is a flow chart of a called number computation based on an identical call distribution ratio according to still another embodiment of the present invention.

Namely, FIG. 14 is a flow chart so as to explain the called number computation method (193) based on the identical call distribution rate of FIGS. 11 and 13.

The call distribution decision indicating number computation method (201) is performed. The detailed descriptions of this call distribution decision indicating number computation method (201) is explained in the flow chart of FIG. 17. The call distribution decision indicating number is computed by the distance main pointer value of the call distribution rate, and is used for computing the index value corresponding to the values from 1 to 100 which are the call distribution rate of the service subscriber.

The called number index computation method is performed by using the call distribution level in step 202. This flow is explained in the flow chart of FIG. 18.

Figure 19:
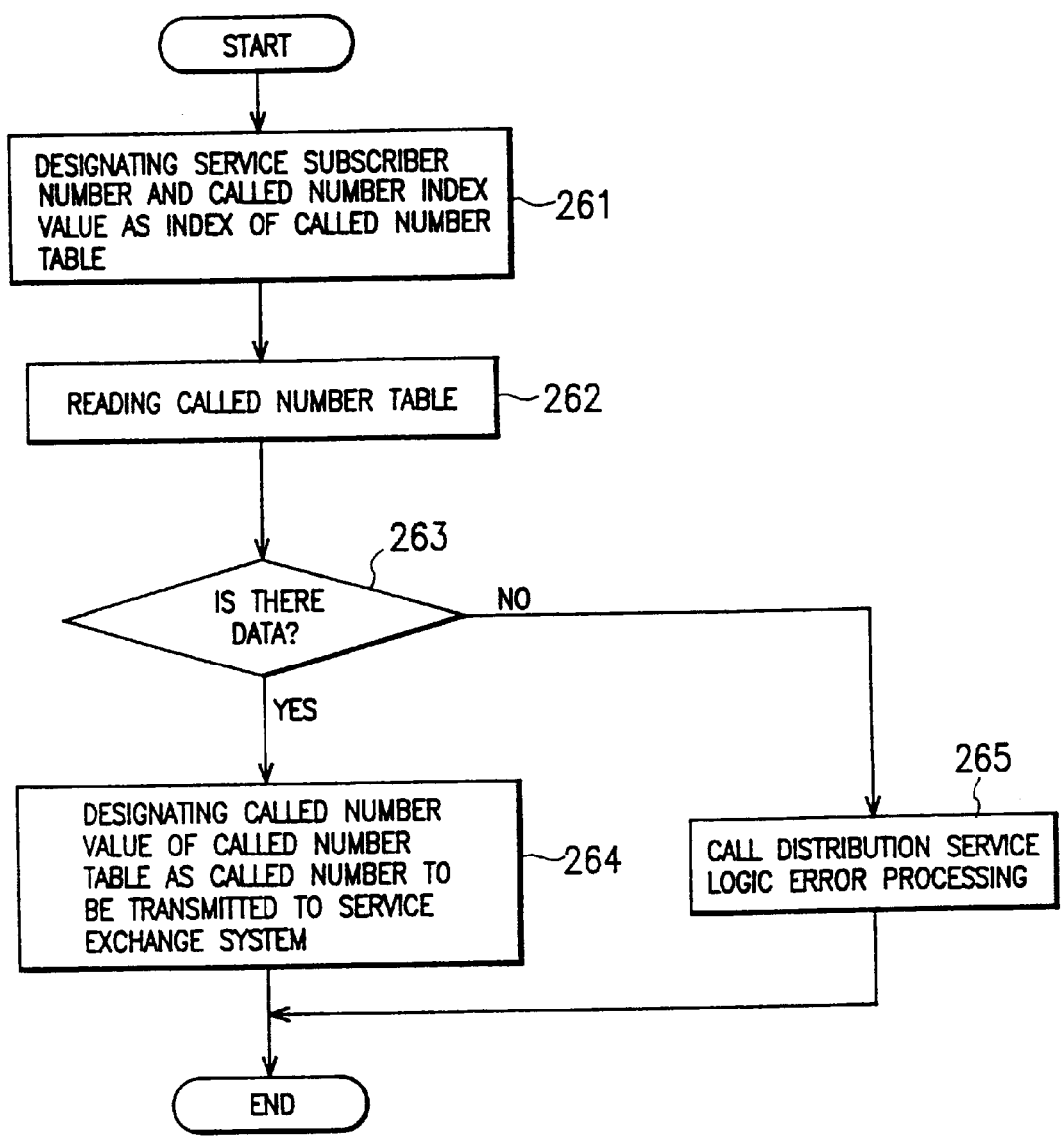
FIG. 19 is a flow chart of a called number computation process according to still another embodiment of the present invention.

The called number computation method is performed based on the called number index in step 203. FIG. 19 is a flow chart so as to explain the called number computation method based on the called number index.

Figure 15:
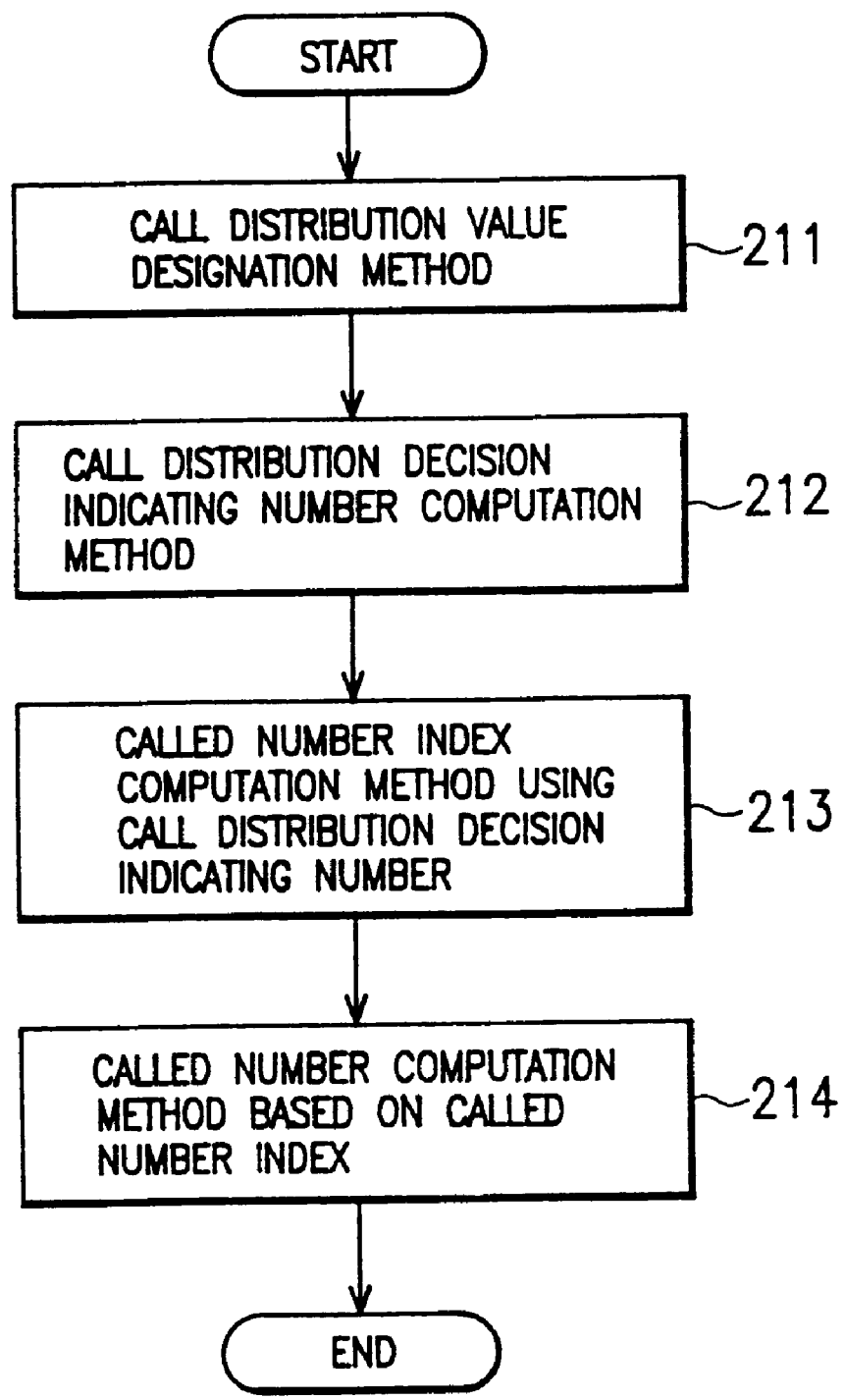
FIG. 15 is a flow chart of a called number computation based on a call distribution ratio with respect to a called party capacity according to still another embodiment of the present invention.

FIG. 15 is a flow chart of the called number computation process based on accordance distribution rate in accordance with the called party capacity according to another embodiment of the present invention.

Namely, the called number computation method based on the call distribution rate in accordance with the called party capacity of FIGS. 10 and 12 is explained in the flow chart of FIG. 15.

The call distribution table is made based on the call distribution rate value designation method (211) in accordance with the called party capacity. The call distribution value designation method (211) is explained in the flow chart of the called distribution value designation based on the called party capacity of FIG. 16.

The call distribution decision indicating number is computed based on the call distribution decision indicating number computation method (212). The call distribution decision indicating number computation method (212) is explained in the flow chart of FIG. 17.

The called number index 82 of the premium-rate service subscriber called number table 62 is computed based on the premium-rate service subscriber call distribution table method of FIG. 5 in accordance with the called number index computation method (213) using the call distribution decision indicating number. The called number index computation method (213) using the call distribution decision indicating number is explained in the flow chart of FIG. 18.

The premium-rate service subscriber called number 83 is computed based on the called number computation method (214) in accordance with the premium-rate service subscriber number 81 and the called number index 82. The called number computation method (214) based on the premium-rate service subscriber number 81 and the called number index 82 is explained in the flow chart of FIG. 19.

Figure 16:
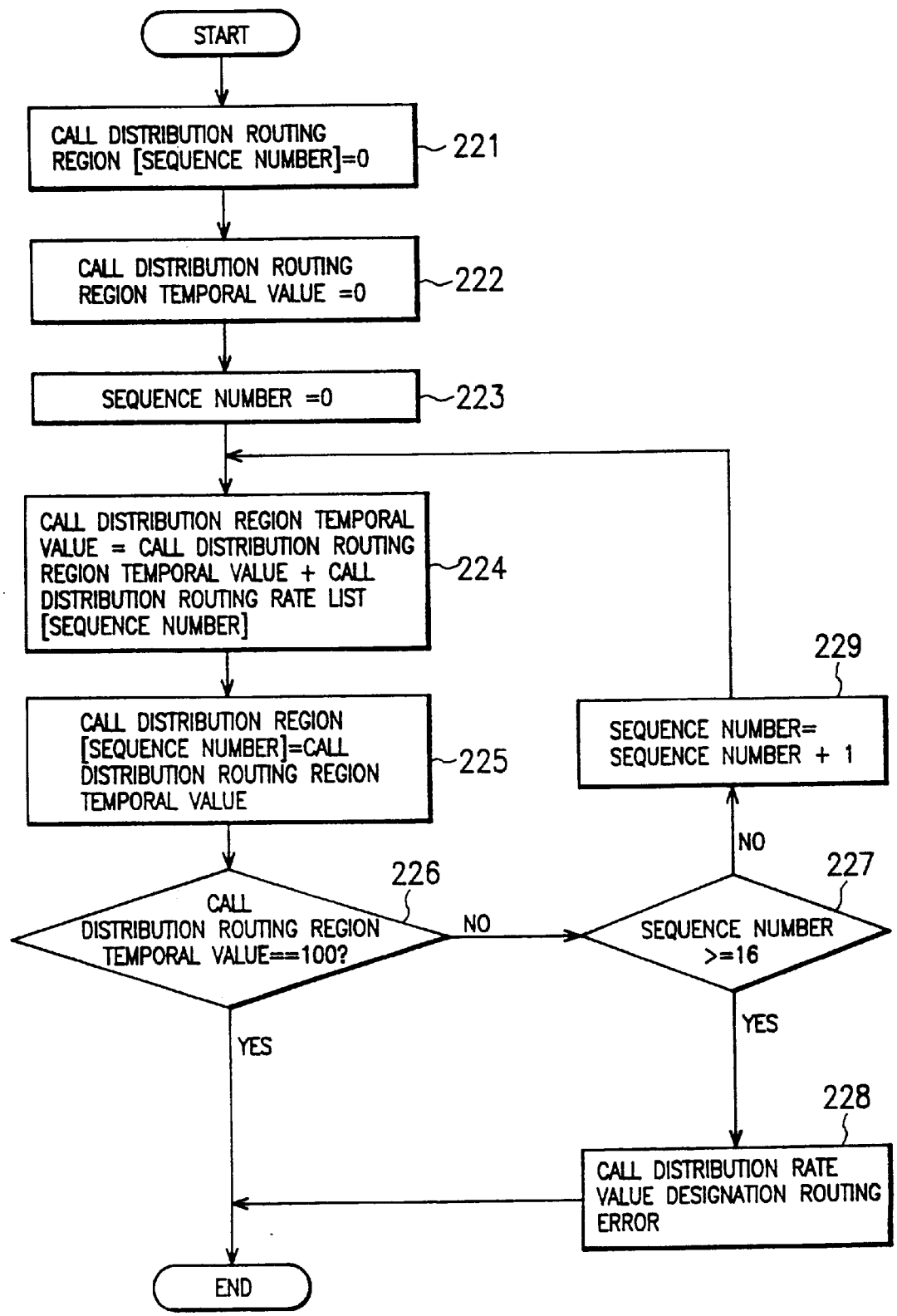
FIG. 16 is a flow chart of a call distribution ratio value customizing process based on the called party capacity according to still another embodiment of the present invention.

FIG. 16 is a flow chart so as to explain the call distribution rate value designation process based on the called party capacity according to another embodiment of the present invention.

Namely, the detailed call distribution rate value designation method (211) in accordance with the called party capacity of FIG. 15 is explained in the flow chart of FIG. 16.

The call distribution routing region [a sequence number] is initialized to 0 in step 221. The sequence number includes 16 digits (the calling area dependent routing is 8) from 0 to 15 (the calling area dependent routing is 7). The call distribution routing region values with respect to 16 sequence numbers (the calling area dependent routing is 8) are initialized in step 221.

The call distribution routing rate region temporal value is initialized to 0 in step 222.

The sequence number is initialized to 0 in step 223.

The sum value of the call distribution routing rate region temporal value and the call distribution rate list [a sequence number] is stored as the call distribution routing rate region temporal value in step 224.

The call distribution routing rate region temporal value is stored in the call distribution routing region [a sequence number] in step 225.

It is judged whether the call distribution routing rate temporal value is 100 in step 226.

If the call distribution routing rate region temporal value is 100, the routine is terminated.

If the call distribution routing rate region temporal value is not 100, it is judged whether the sequence number is greater than 16 (the calling area dependent routing is 8) in step 227.

In addition, if the call distribution routing rate region temporal value is not 100, and the sequence number is equal to 16 (the calling area dependent routing is 8) or is greater than 16 (the calling area dependent routing is 8), the call distribution value designation routing error message is computed, and the routine is terminated in step 228.

If the call distribution routing rate region temporal value is not 100, and the sequence number is not equal to 16 nor is not greater than 16, "1" is added to the sequence number, and the resultant value is stored in step 229. Thereafter, step 224 that the sum of the call distribution routing rate region temporal value and the call distribution routing rate list [a sequence number] is stored as the call distribution routing rate region temporal value is repeated.

Figure 17:
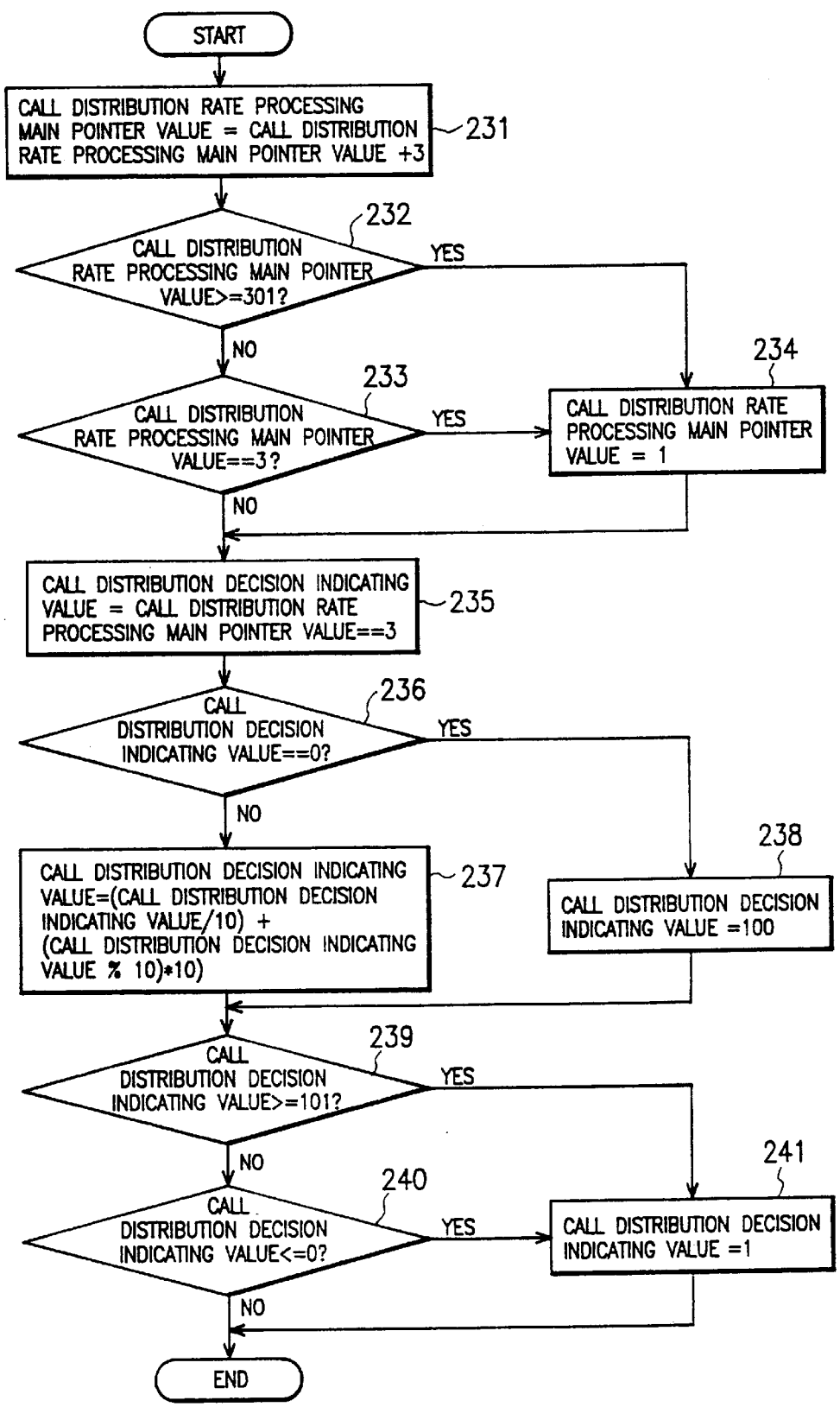
FIG. 17 is a flow chart of a call distribution decision indication number computation process according to still another embodiment of the present invention.

FIG. 17 is a flow chart so as to explain the call distribution decision indicating number computation process according to another embodiment of the present invention.

"3" is added to the processing main pointer value of the call distribution rate, and the resultant value is stored in the call distribution rate processing main pointer value in step 231.

The most desired judgement level value is computed by adding 3 to the call distribution rate processing main pointer value one by one whenever the service control system is requested a call from the service exchange system, for thus obtaining the effect of the call distribution.

It is judged whether the call distribution rate processing main pointer value is equal to 301 or greater than 301 in step 232.

As a result, if the call distribution rate processing main pointer value is less than 301 or is not equal to 301, it is judged whether the call distribution rate processing main pointer value, is 3 in step 233.

If the call distribution rate processing main pointer value is greater than 301 or is equal to 301, the call distribution rate processing main pointer value is stored as "1" in step 234.

If the call distribution rate processing main pointer value is not greater than 301 nor equal to 301, and the call distribution rate processing main pointer value is 3, the call distribution rate processing main pointer value is stored as "1" in step 234.

If the call distribution rate processing main pointer value is not greater nor equal to 301, and the call distribution rate processing main pointed value is not 3, the call distribution rate processing main pointer value is divided by 100, and the remaining value is stored as the call distribution level in step 235.

It is judged whether the call distribution decision indicating number is 0 in step 236.

If the call distribution decision indicating number is not 0, the value of the call distribution decision indicating number computed by [(the call distribution decision indicating number/10)+(the call distribution decision indicating number % 10)*10] is stored as 100 in step 238.

In addition, it is judged whether the value of the computed call distribution decision indicating number is greater than 101 or equal thereto in step 239. As a result, if the value of the computed call distribution decision indicating number is greater than 101 and equal thereto, the value of the call distribution decision indicating number is designated as "1" in step 241, and if the value of the computed call distribution decision indicating number is not equal to 101 nor greater than 101, and the level is less than 0 or equal thereto in step 240, the value of the call distribution decision indicating number is designated as "1" in step 241, otherwise the routine is terminated.

Figure 18:
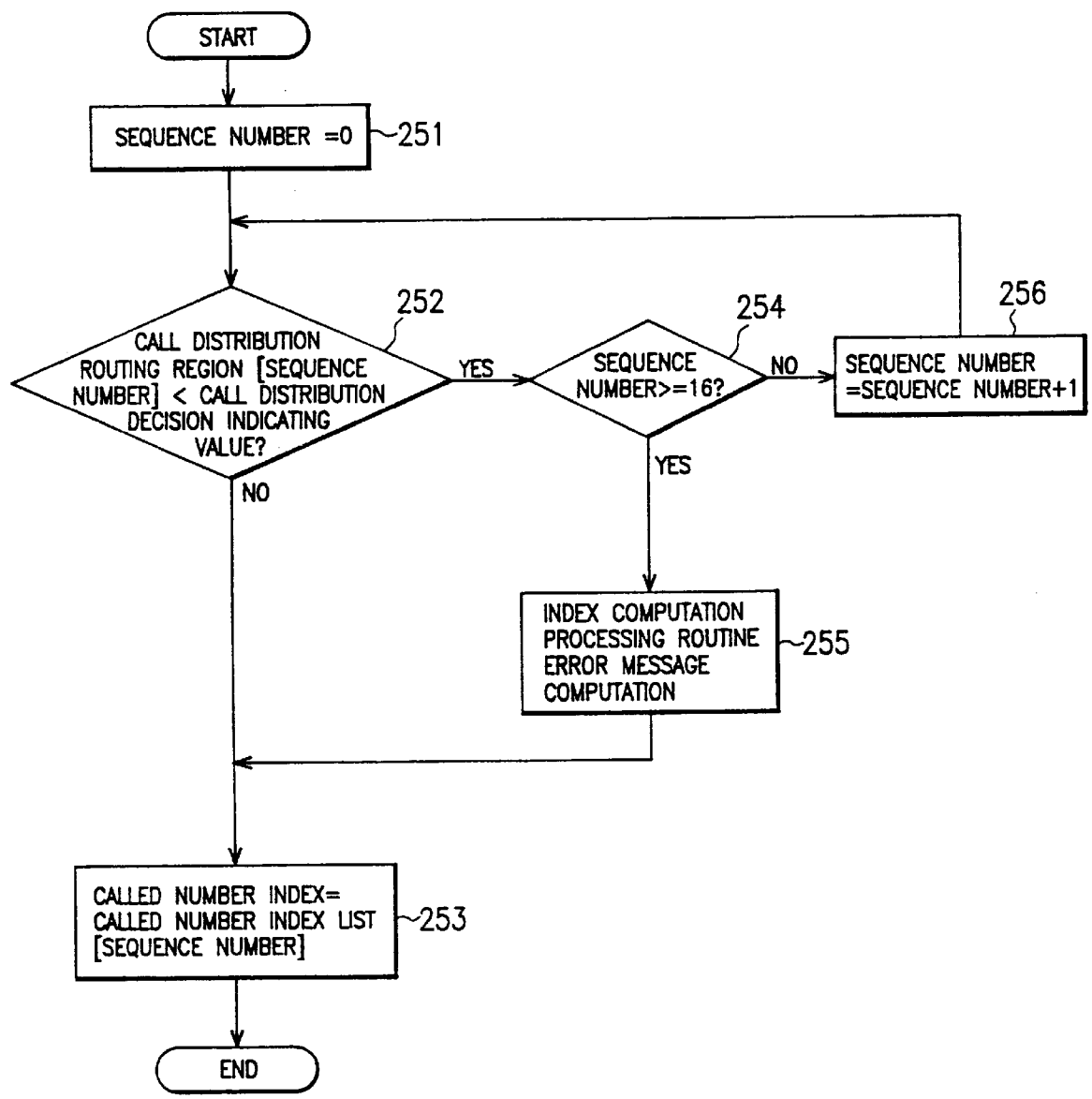
FIG. 18 is a flow chart of a called number index computation process according to still another embodiment of the present invention.

FIG. 18 is a flow chart so as to explain the called number index computation process according to another embodiment of the present invention.

The sequence number used for the call distribution routing region is initialized to 0 and is stored in step 251.

It is judged whether the call distribution routing region [a sequence number] is less than the value of the call distribution decision indicating number in step 252.

If the value of the call distribution routing region [a sequence number] is not less than the value of the call distribution decision indicating number, the called number index routing region [a sequence number] is computed as the called number index value in step 253.

If the value of the call distribution routing region [a sequence number] is less than the value of the call distribution decision indicating number, it is judged whether the sequence number is greater than 16 [the calling area dependent routing is 8] or equal thereto in step 254.

If the sequence number is not greater than 16 (the calling area dependent routing is 8) nor equal thereto, "1" is added to the sequence number, and the sequence number is designated again in step 256, and step 252 of judging whether the value of the call distribution routing region [a sequence number] is less than the value of the call distribution decision indicating number is repeatedly processed.

If the value of the call distribution routing region [a sequence number] is less than the value of the call distribution decision indicating number, and if the sequence number is greater than 16 (the calling area dependent routing is 80 or equal thereto, the error message is computed because an error occurred in an index computation processing routine in step 255.

If the routine is in a normal state, the routine of the index computation processing routine error message computation (256) is not performed.

FIG. 19 is a flow chart so as to explain the called number computation process according to another embodiment of the present invention.

The service subscriber number and the called number index value are designated as an index value of the called number table in step 161.

The premium-rate service subscriber called number table is read in step 262.

It is judged whether there is a data in the premium-rate service subscriber called number table based on the index value of the called number table with respect to the service subscriber number and the called number index value in step 263.

If there is not the data in the premium-rate service subscriber called number table based on the index value of the called number table with respect to the service subscriber number and the called number index value, the routine is judged as a call distribution routing service logic error for computing the called number in step 265. If the routine is in the normal state, the call distribution service logic error process (265) does not occur. If there is a data in the premium-rate service subscriber called number table based on the index value of the called number table with respect to the service subscriber number and the called signal index value, the called number is computed, and the value of the computed called number is designated as a called number value to be transmitted to the service exchange system in step 264.

FIG. 20 is a flow chart so as to explain the identical call distribution rate value designation process according to another embodiment of the present invention.

The call distribution routing region [a sequence number] is initialized to 0 in step 271.

The value obtained by dividing the number of the routing possible called number by 100 is designated as the value of the identical distribution rate in step 272.

The identical call distribution rate is designated with respect to the call distribution routing region [a sequence number] in step 273.

The residual call distribution rate [100-(the identical call distribution rate * the number of the routing possible call distributions)] is computed in step 274.

If the residual call distribution rate is 0 in step 275, the routine is terminated, and if the residual call distribution rate is not 0, the residual call distribution rate is added to the call distribution routing region [a sequence number], and the final call distribution routing region [a sequence number] is designated in step 276.

As described above, the call distribution processing method for a called line number computation in a premium-rate service according to the present invention is directed to performing a service subscriber dependent call distribution service function, a calling area dependent routing service function, a calling area dependent call distribution routing function, one number service function, etc in the premium-rate service, routing to various called numbers designated in accordance with the calling region, and call-distributing in accordance with the capacity of the called party number. In addition, it is possible to route the called number in accordance with the call distribution rate designated by the premium-rate service subscriber by adapting the premium-rate service subscriber call distribution routing processing method which is capable of routing to the called number. Since the load of the service control/management system is small, it is possible to more effectively perform the call processing of the system. When the call processing is performed from 1 to 100 by N-times, an occurrence frequency is even, and the value which occurred in the random function does not identically occur. In addition, the statistic, which the call can be connected between the calling side and the called side in accordance with the routing in the way that the subscriber wants with respect to the call distribution service function, the calling area dependent routing service function, the calling area dependent call distribution routing function, the one number service system, etc, is increased, so that an information provider can provide more information. In addition, the information user can receive more information when the user wants, and the information provide can have much opportunity for providing information.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A called number computation method based on a call distribution rate in accordance with a called party capacity, comprising the steps of:

forming a call distribution rate table based on a call distribution value designation method in accordance with the called party capacity, computing a call distribution decision indicating number based on a call distribution decision indicating number computation method, computing a called number index of a premium-rate service subscriber called number table based on a called number index computation method by using the call distribution decision indicating number, and computing a premium-rate service subscriber called number based on the called number computation method in accordance with the called number index.

2. An identical call distribution rate value designation method, comprising the steps of:

(a) initializing a call distribution routing region as 0, designating a value obtained by dividing 100 by a number of routing possible called numbers as the value of an identical call distribution rate, computing a residual call distribution rate after designating the identical call distribution rate with respect to the call distribution routing region, and judging whether a residual call distribution rate is 0; and (b) terminating the judging step when the residual call distribution rate is 0, and designating a final call distribution routing region when the residual call distribution rate is not 0.

3. The method of claim 1, wherein said call distribution value designation method, comprising the steps of:

initializing a call distribution routing region to 0, a called distribution routing rate region temporal value to 0, and a sequence number to 0, storing a sum value of a call distribution routing region temporal value and a call distribution routing rate list as the call distribution routing region temporal value, and the call distribution routing region temporal value as the call distribution routing region, and judging whether the call distribution routing region temporal value is 100;

terminating the judging step when the call distribution routing rate region temporal value is 100, and judging whether the sequence number is greater than or equal to 16 (the calling area dependent routing is 8) when the call distribution routing rate region temporal value is not 100; and performing a step of computing a call distribution rate value designation routing error message when the sequence number is greater than or equal to 16 (the calling area dependent routing is 8), adding "1" to the sequence number when the sequence number is not greater than nor equal to 16 and storing the value, and storing the sum value of the call distribution routing region temporal value and the call distribution routing rate list as the call distribution routing region temporal value.

4. The method of claim 3, wherein said sequence number includes 16 numbers (the calling area dependent routing is 8), which are from 0 to 15 (the calling area dependent routing is 7).

5. The method of claim 1, wherein said call distribution decision indicating number computation method, comprising the steps of:

adding 3 to a call distribution rate processing main pointer value, storing the result in the call distribution rate processing main pointer value, and judging whether the call distribution rate processing main pointer value is greater than or equal to 301;

storing the call distribution rate processing main pointer value as 1 when the call distribution rate processing main pointer value is greater than or equal to 301 in the judging step, or the call distribution rate processing main pointer value is not greater than nor equal to 301 and the call distribution rate processing main pointer value is 3, storing a residual value as the call distribution decision indicating number by dividing the call distribution rate processing main pointer value by 100, and storing the residual value as the call distribution decision indicating number by dividing the call distribution rate processing main pointer value by 100 when the call distribution rate processing main pointer value is not greater than nor equal to 301, and the call distribution rate processing main pointer value is not 3, and judging whether the call distribution decision indicating number is 0;

first designating the call distribution decision indicating number as a value computed through (the call distribution decision indicating number/10)+((the call distribution decision indicating number % 10)*10), storing the call distribution decision indicating number as 100 when the call distribution decision indicating number is 0, and judging whether the value of the call distribution decision indicating number is greater than or equal to 101; and second designating the call distribution decision indicating number as 1 when the call distribution decision indicating number computed in the first designating step is greater than or equal to 101, or the value of the computed call distribution decision indicating number is not greater than 101, and the call distribution decision indicating number is less than or equal to 0, and otherwise for terminating the routine.

6. The method of claim 1, wherein said called number index computation method, comprising the steps of:

initializing a sequence number used for a call distribution routing region as 0, and first judging whether a value of the call distribution routing region is less than a value of the call distribution decision indicating number;

computing a called number index list as a called number index value when the value of the call distribution routing region is not less than the value of the call distribution decision indicating number in the first judging step, and second judging whether the sequence number is greater than or equal to 16 (the calling area dependent routing is 8) when the value of the call distribution routing region is less than the value of the call distribution decision indicating number; and designating the sequence number after adding 1 to the sequence number when the sequence number is not greater than nor equal to 16 (the calling area dependent routing is 8) in the second judging step, third judging whether the value of the call distribution routing region is less than the value of the call distribution decision indicating number, computing an error message indicating that there is an error in the index computation processing routine when the sequence number is greater than or equal to 16 (the calling area dependent routing is 8), and computing the called number index list as the called number index value.

* * * * *